(12) United States Patent
Sakurai et al.

(10) Patent No.: US 10,923,056 B2
(45) Date of Patent: Feb. 16, 2021

(54) DISPLAY BOARD AND DISPLAY DEVICE INCLUDING A PLURALITY OF CIRCUIT BLOCKS WITH DIFFERENT NUMBERS OF UNIT CIRCUITS

(71) Applicant: Sharp Kabushiki Kaisha, Osaka (JP)

(72) Inventors: Takehisa Sakurai, Sakai (JP); Kazuhiko Tsuda, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 15/776,454

(22) PCT Filed: Nov. 14, 2016

(86) PCT No.: PCT/JP2016/083705
§ 371 (c)(1),
(2) Date: May 16, 2018

(87) PCT Pub. No.: WO2017/086273
PCT Pub. Date: May 26, 2017

(65) Prior Publication Data
US 2018/0322837 A1  Nov. 8, 2018

(30) Foreign Application Priority Data
Nov. 19, 2015 (JP) .................. 2015-226656

(51) Int. Cl.
*G09G 3/36* (2006.01)
*G02F 1/133* (2006.01)
(Continued)

(52) U.S. Cl.
CPC ....... *G09G 3/3648* (2013.01); *G02F 1/13306* (2013.01); *G02F 1/13452* (2013.01);
(Continued)

(58) Field of Classification Search
CPC ...... G09G 3/3677; G09G 3/3648; G09G 9/30; G02F 1/13306; G02F 1/13452; G02F 1/13454; G09F 9/30
(Continued)

(56) References Cited

U.S. PATENT DOCUMENTS

2007/0164954 A1* 7/2007 Yang .................... G09G 3/3677
345/88
2008/0266210 A1* 10/2008 Nonaka .................... G09G 3/20
345/55

(Continued)

FOREIGN PATENT DOCUMENTS

JP  2008-292995 A  12/2008
JP  2009-122636 A  6/2009

OTHER PUBLICATIONS

Official Communication issued in International Patent Application No. PCT/JP2016/083705, dated Jan. 31, 2017.

*Primary Examiner* — Adam J Snyder
(74) *Attorney, Agent, or Firm* — Keating & Bennett, LLP

(57) ABSTRACT

An array board includes a display area having a non-rectangular shape, TFTs disposed in the display area, a plurality of gate lines disposed in the display area and connected to the TFTs, a non-display area surrounding the display area, unit circuits disposed in the non-display area and connected to the gate lines, and a block connection line. The unit circuits are linearly arranged in the non-display area to form circuit blocks. The circuit blocks in the non-display area form a gate circuit portion in which at least two of the circuit blocks are away from each other in an oblique direction with respect to an arrangement direction of the unit circuits. The block connection line extends across the circuit blocks in the non-display area. The block connection line is connected to the circuit blocks.

17 Claims, 17 Drawing Sheets

(51) Int. Cl.
*G02F 1/1345* (2006.01)
*G09F 9/30* (2006.01)

(52) U.S. Cl.
CPC ...... *G02F 1/13454* (2013.01); *G02F 2201/56* (2013.01); *G09F 9/30* (2013.01); *G09G 2300/0426* (2013.01); *G09G 2310/0232* (2013.01); *G09G 2310/0281* (2013.01)

(58) Field of Classification Search
USPC ....................................................... 345/100
See application file for complete search history.

(56) References Cited

U.S. PATENT DOCUMENTS

| | | | |
|---|---|---|---|
| 2009/0102758 A1* | 4/2009 | Anzai | G09G 3/3225 345/76 |
| 2009/0189835 A1* | 7/2009 | Kim | G09G 3/3677 345/80 |
| 2010/0141570 A1* | 6/2010 | Horiuchi | G09G 3/3611 345/100 |
| 2015/0355487 A1* | 12/2015 | Emmert | G09G 3/36 349/33 |
| 2016/0240141 A1* | 8/2016 | Lee | G09G 3/3258 |
| 2016/0247478 A1* | 8/2016 | Ishige | G09G 3/3677 |
| 2017/0116923 A1* | 4/2017 | Bae | G09G 3/3266 |
| 2017/0124977 A1* | 5/2017 | Suzuki | G09G 3/3677 |
| 2017/0178563 A1 | 6/2017 | Anzai et al. | |

* cited by examiner

DISPLAY BOARD AND DISPLAY DEVICE INCLUDING A PLURALITY OF CIRCUIT BLOCKS WITH DIFFERENT NUMBERS OF UNIT CIRCUITS

TECHNICAL FIELD

The present invention relates to a display board and a display device.

BACKGROUND ART

A display device disclosed in Patent Document 1 listed below is known as one example of a conventional display device having a non-rectangular display screen. The display device disclosed in Patent Document 1 includes an active matrix display section including signal lines and scanning lines arranged in a matrix on a board and pixels and active elements on intersections of the signal lines and the scanning lines, a scanning line driving circuit that drives the scanning lines, and a signal line driving circuit that drives the signal lines. The display section has a non-rectangular outline. At least one of the scanning line driving circuit and the signal line driving circuit includes active elements produced by the same steps as the active elements included in the active matrix. At least one of the scanning line driving circuit and the signal line driving circuit includes circuit units having the same function. The circuit units are disposed along an outer circumference of the non-rectangular display section.

RELATED ART DOCUMENT

Patent Document

Patent Document 1: Japanese Unexamined Patent Application Publication No. 2008-292995

PROBLEM TO BE SOLVED BY THE INVENTION

In the display device disclosed in Patent Document 1, the outline of the non-rectangular display section is partly or entirely curved. The circuit units are arranged in a curved line along the outline of the display section. Thus, the positions of the circuit units need to be individually adjusted depending on the curvature of the curved outline of the display section, leading to difficulty in the arrangement of the circuit units.

DISCLOSURE OF THE PRESENT INVENTION

The invention was made based on the above-described circumstances and an object thereof is to make the arrangement of the unit circuits easy.

MEANS FOR SOLVING THE PROBLEM

A display board according to the invention includes a display area having a non-rectangular shape, display elements disposed in the display area, element connection lines disposed at least in the display area and connected to the display elements, a non-display area surrounding the display area, unit circuits disposed in the non-display area and connected to the element connection lines, and a block connection line. The unit circuits are linearly arranged in the non-display area to form circuit blocks. The circuit blocks in the non-display area form an element drive circuit portion in which at least two of the circuit blocks are away from each other in an oblique direction with respect to an arrangement direction of the unit circuits in which the unit circuits are arranged. The block connection line extends across the circuit blocks in the non-display area and connected to the circuit blocks.

As described above, the element drive circuit portion includes the circuit blocks disposed in the non-display area, and the circuit blocks each include the unit circuits that are linearly arranged. Signals are transmitted from the unit circuits to the display elements in the display area via the element connection lines to drive the display elements.

The display area has a non-rectangular shape and the unit circuits included in each of the circuit blocks are linearly arranged. Thus, the unit circuits are readily arranged compared with a conventional configuration in which the unit circuits are arranged in a curved line along the outline of the display area. Furthermore, at least two of the circuit blocks in the element drive circuit portion are separated from each other in an oblique direction at an angle relative to the arrangement direction of the unit circuits. Thus, the block connection line extending across the circuit blocks and connected to the circuit blocks are able to be disposed in a space between the adjacent circuit blocks that are separated from each other in the oblique direction. This allows the block connection line to be designed with a high degree of freedom, eliminating the need of a high-precision production apparatus for forming the circuit blocks and the block connection line by photolithography or other methods and requiring only a low-precision production apparatus. This reduces the production cost. Examples of the "non-rectangular display area" include a "display area having an outline at least partly curved" and a "display area having a polygonal outline having an acute or obtuse interior angle".

The configurations described below are preferable embodiments of the invention.

(1) The circuit blocks may include a large circuit block having a relatively large number of the unit circuits and a small circuit block having a relatively small number of the unit circuits. In this configuration, the large circuit block includes more unit circuits linearly arranged than the small circuit block. Thus, the unit circuits are readily arranged compared with a case where the circuit blocks include only the small circuit blocks.

(2) The arrangement direction of the unit circuits in the large circuit block may extend in a perpendicular direction that is perpendicular to an extending direction of the element connection lines. This configuration allows the element connection lines connected to the unit circuits included in the large circuit block to be short compared with a case where the unit circuits in the large circuit block are arranged in the extending direction of the element connection lines. Thus, the element connection lines are efficiently arranged.

(3) The display area may have a dimension in the extending direction that varies with positions in the perpendicular direction. The large circuit block is located at a position in the perpendicular direction where the dimension of the display area in the extending direction is maximum. In this configuration, the large circuit block is efficiently arranged in the non-display area, allowing the frame size to be favorably reduced.

(4) The display area may have a circular shape in a plan view, and the large circuit block may be located at a middle in the perpendicular direction and the small circuit blocks may be located at an end in the perpendicular direction. In this configuration, the large circuit block and the small circuit block are efficiently arranged in the non-display area, allowing the frame size to be further favorably reduced.

(5) The small circuit block may include at least two small circuit blocks symmetrically arranged in the perpendicular direction. In this configuration, the unit circuits in each of the small circuit blocks are readily arranged.

(6) The arrangement direction of the unit circuits in the small circuit blocks may extend in the perpendicular direction. In this configuration, the arrangement direction of the unit circuits in the large circuit block and that in the small circuit block are the same, allowing the unit circuits to be further readily arranged.

(7) The large circuit block may be located at a middle in the perpendicular direction in the non-display area and the small circuit block may be arranged at an end in the perpendicular direction in the non-display area. The arrangement direction of the unit circuits in the small circuit block may extend in the extending direction. This configuration readily allows the element connection lines connected to the small circuit block to be short compared with a case where the arrangement direction of the unit circuits included in the small circuit block extends in the perpendicular direction in the same way as the unit circuits included in the large circuit block. Thus, the gate lines are efficiently arranged.

Next, to solve the above-described problem, a display device of the invention includes the above-described display board and a counter board facing the display board. Since the unit circuits in the display board are readily arranged, the display device having such a configuration is able to be produced at a lower cost.

ADVANTAGEOUS EFFECT OF THE INVENTION

The present invention makes the arrangement of the unit circuits easy.

MODE FOR CARRYING OUT THE INVENTION

First Embodiment

A first embodiment of the invention is described with reference to FIG. 1 to FIG. 7. In this embodiment, a liquid crystal display device 10 including a liquid crystal panel 11 as a display panel is described as an example. In some of the drawings, the X, Y, and Z axes are indicated. The axes in each drawing correspond to the respective axes in other drawings.

Figure 1:
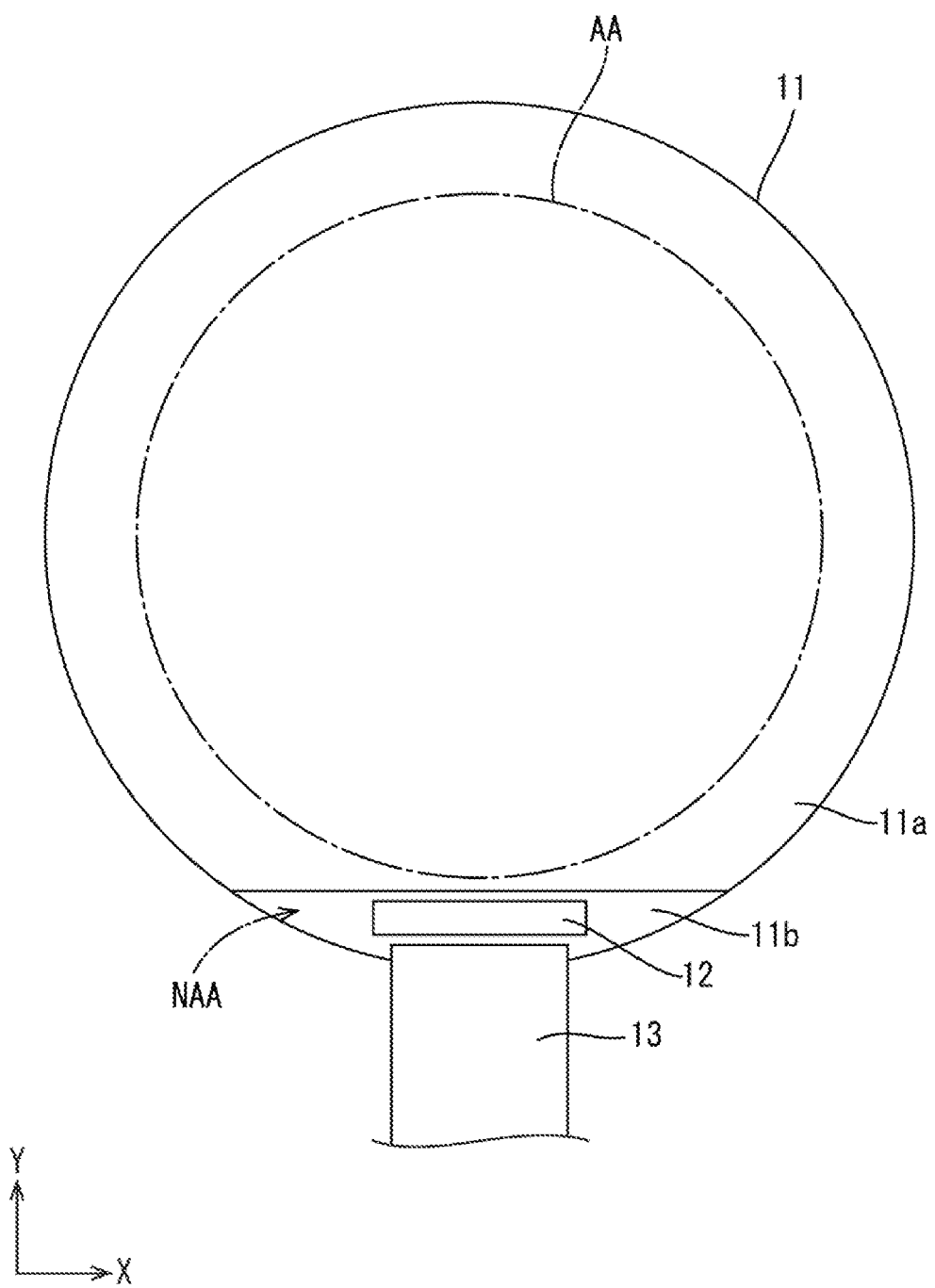
FIG. 1 is a plan view of a liquid crystal panel constituting a liquid crystal display device according to a first embodiment of the invention.

The liquid crystal display device 10 has a substantially circular overall shape. As illustrated in FIG. 1, the liquid crystal display device 10 at least includes the liquid crystal panel (a display device, a display panel) 11 and a backlight unit (a lighting unit). The liquid crystal panel 11 is configured to display images. The backlight unit is disposed on a back side of the liquid crystal panel 11 and configured to provide light to the liquid crystal panel 11 for displaying. Hereinafter, among the components of the liquid crystal display device 10, the liquid crystal panel 11, is described in detail, but the other components, such as the backlight unit having a well-known configuration, are not described in detail. It is preferable that the liquid crystal display device 10 according to the embodiment be used in electronic devices (not illustrated), such as a smart watch, but may be used in other devices.

Figure 2:
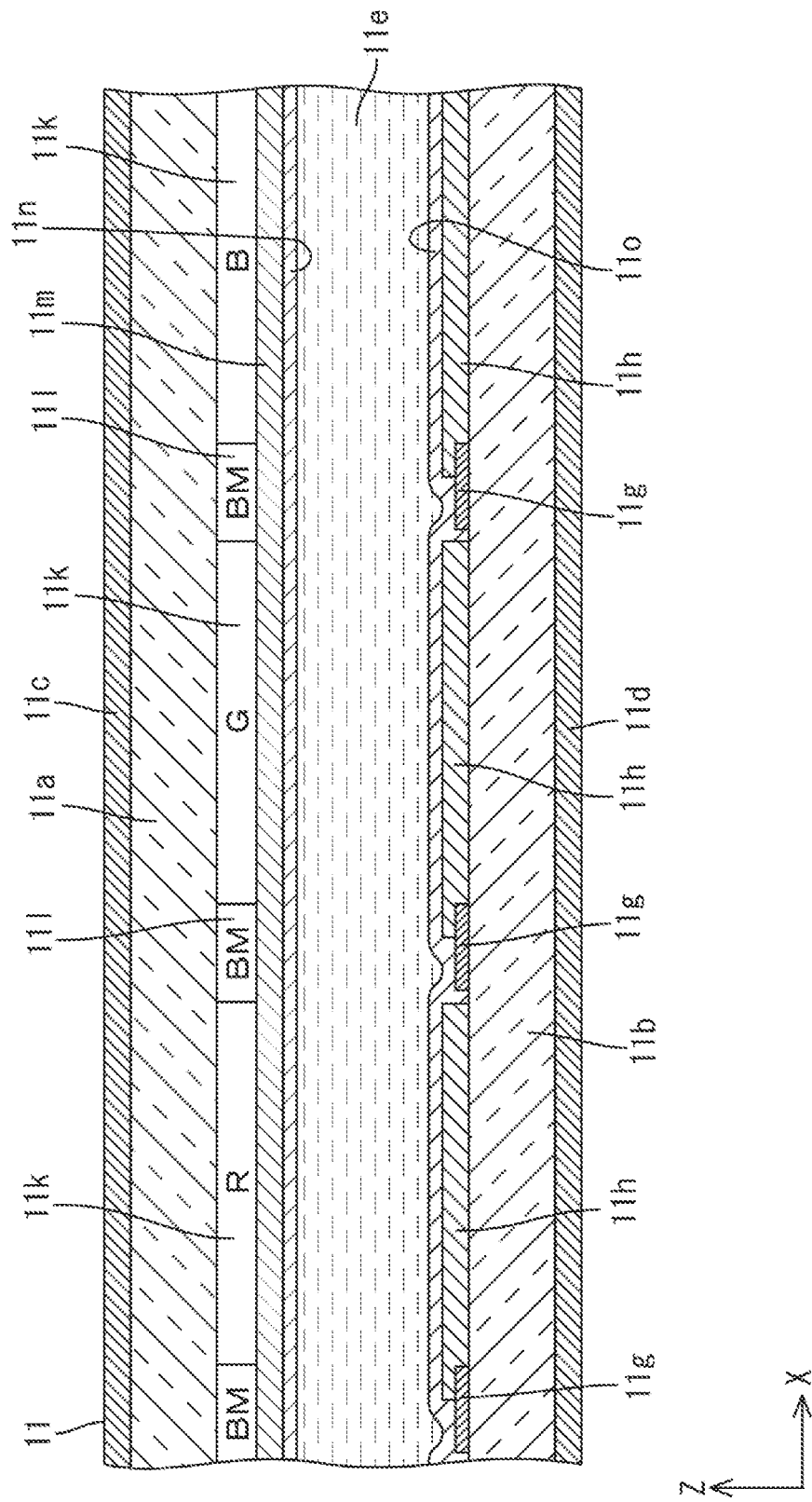
FIG. 2 is a cross-sectional view of the liquid crystal panel included in the liquid crystal display device.

As illustrated in FIG. 1, the liquid crystal panel 11 has a substantially circular overall shape in plan view. As illustrated in FIG. 2, the liquid crystal panel 11 at least includes a pair of substantially transparent glass boards 11a and 11b having high light transmissivity and a liquid crystal layer 11e between the boards 11a and 11b. The liquid crystal layer 11e includes liquid crystals (liquid-crystal material), which are substances having optical characteristics that vary according to application of electric field. The liquid crystal panel 11 includes a substantially circular display area (an active area) AA on which images are displayed and a substantially annular (doughnut shaped) non-display area (a non-active area) NAA on which images are not displayed. The display area AA is located at a central area of a screen. The non-display area NAA is located in an outer peripheral portion of the screen to surround the display area AA. The liquid crystal panel 11 is configured to display images in the display area AA using light provided by the backlight unit. The front side of the liquid crystal panel 11 is a light exiting side. Polarizing plates 11c and 11d are attached to outer surfaces of the boards 11a and 11b, respectively.

Figure 3:
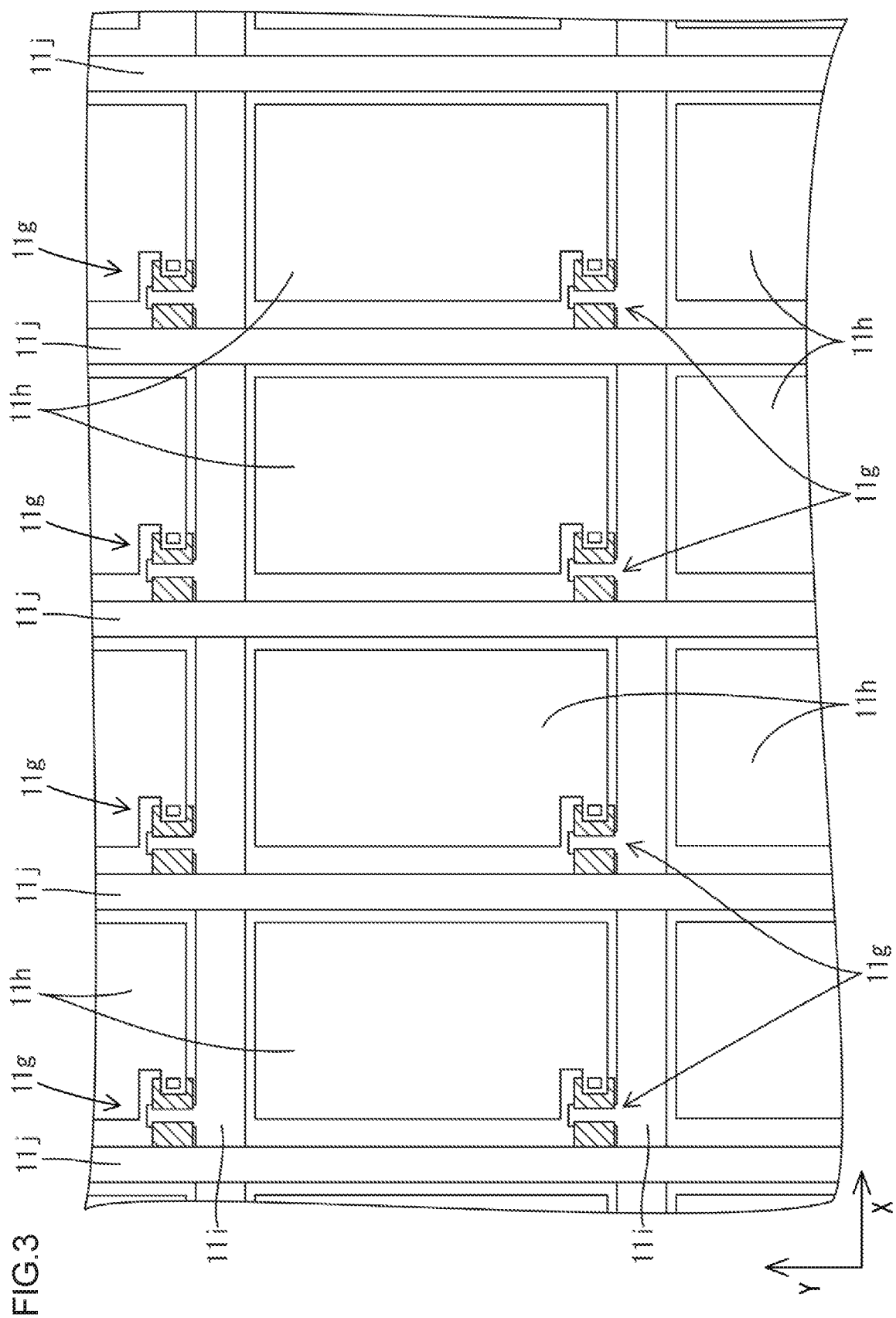
FIG. 3 is a magnified plan view illustrating a plan configuration of an array board included in the liquid crystal panel in a display area.

One of the boards 11a and 11b included in the liquid crystal panel 11 on the front side (front surface side) is a CF board 11a and the other on the rear side (rear surface side) is an array board (a display board) 11b. As illustrated in FIG. 2 and FIG. 3, many TFTs (thin film transistors, display elements) 11g, which are switching elements, and many pixel electrodes 11h are arranged in a matrix (rows and columns) on an inner surface of the array board 11b (on a side adjacent to the liquid crystal layer 11e or a side facing the CF board 11a) in the display area AA. Gate lines (element connection lines, scanning lines) 11i and source lines (data lines) 11j are routed to form a grid and to surround the TFTs 11g and the pixel electrodes 11h. The gate lines 11i and the source lines 11j are respectively connected to gate electrodes and source electrodes of the TFTs 11g, and the pixel electrodes 11h are connected to drain electrodes of the TFTs 11g. The TFTs 11g are driven in response to the signals supplied to the gate lines 11i and the source lines 11j. Supply of potential to the pixel electrodes 11h is controlled based on the driving. The TFTs 11g each include a channel portion connecting the drain electrode and the source electrode to each other. An oxide semiconductor material is used as a semiconductor film that forms the channel portion. The oxide semiconductor material forming the channel portion has electron mobility higher than that of amorphous silicon material, for example, about 20 times to about 50 times higher than that of amorphous silicon material. Thus, the TFTs 11g are able to be easily downsized and an amount of light transmitting through the pixel electrodes 11h (aperture ratio of the pixel) is able to be increased to the maximum. The oxide semiconductor material is preferably employed to provide higher resolution and to reduce power consumption. The pixel electrodes 11h are disposed in respective quadrilateral areas defined by the gate lines 11i and the source lines 11j and are transparent electrodes made of indium tin oxide (ITO) or zinc oxide (ZnO). In this embodiment, the extending direction of the gate lines 11i matches the X-axis direction, and a perpendicular direction, which is perpendicular to the extending direction of the gate lines 11i, and the extending direction of the source lines 11j match the Y-axis direction, in the drawings.

Figure 4:
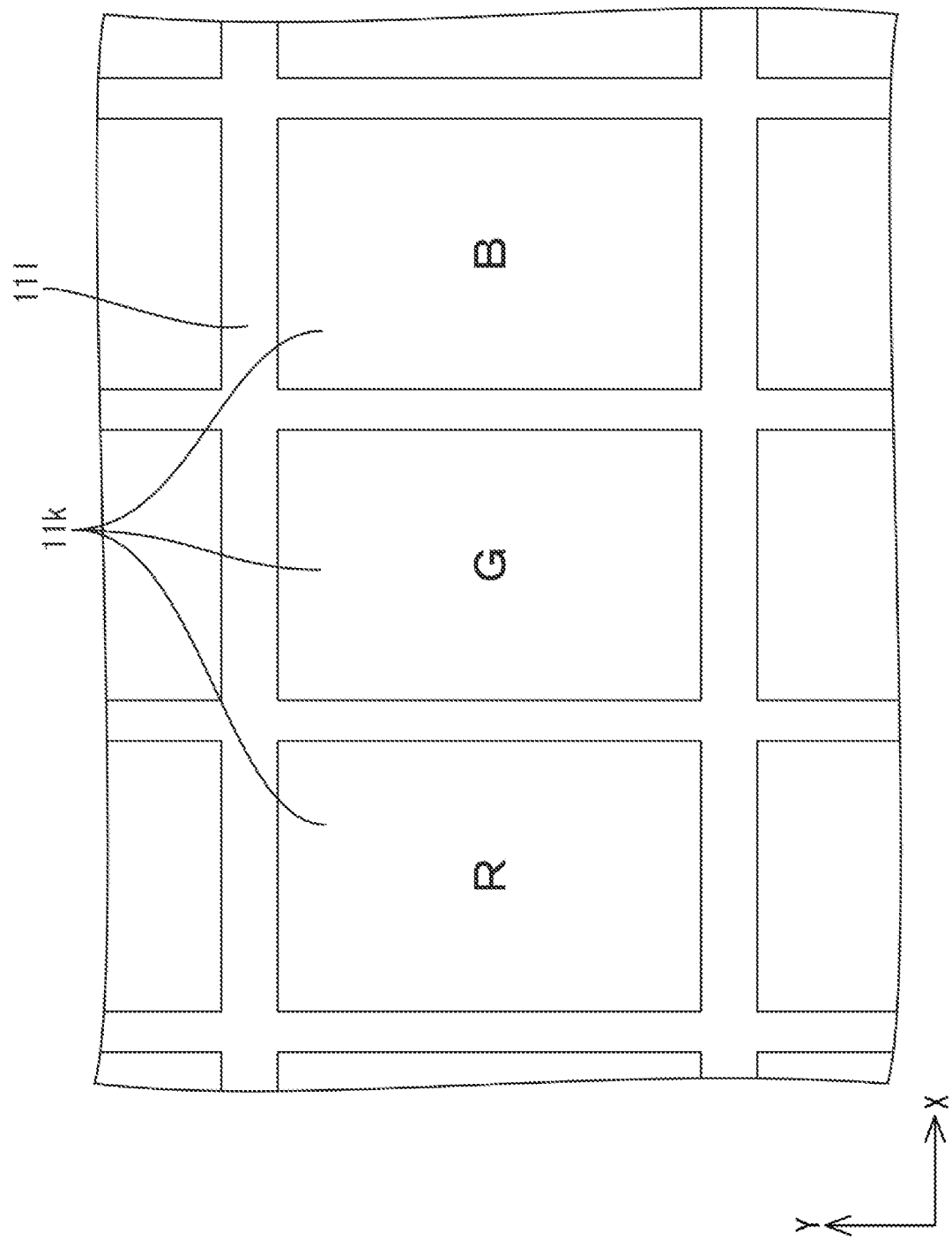
FIG. 4 is a magnified plan view illustrating a plan configuration of a CF board included in the liquid crystal panel in a display area.

As illustrated in FIG. 2 and FIG. 4, many color filters 11k are arranged in a matrix on an inner surface of the CF board 11a in the display area AA so as to face the pixel electrodes 11h on the array board 11b. The color filters 11k include R (red), G (green), and B (blue) color filters arranged repeatedly in a predetermined order. A light blocking layer (a black matrix) 11l is formed between the color filters ilk to prevent mixture of colors. The light blocking layers 11l overlap the above-described gate lines 11i and the source lines 11j in plan view. A planar counter electrode 11m facing the pixel electrodes 11h on the array board 11b is disposed on the surfaces of the color filters ilk and the light blocking layers 11l. Alignment films 11n and 11o are respectively formed on inner surfaces of the boards 11a and 11b for orienting liquid crystal molecules in the liquid crystal layer 11e. In the liquid crystal panel 11, R (red), G (green), and B (blue) color filters 11k and three pixel electrodes 11h facing the respective color filters 11k form one display pixel, which is a display unit. The display pixel includes a red pixel including the R color filter 11k, a green pixel including the G color filter 11k, and a blue pixel including the B color filter 11k. The pixels of each color are repeatedly arranged in the row direction (the X-axis direction) on a planar surface of the liquid crystal panel 11 to form a pixel group. Many pixel groups are arranged in the column direction (the Y-axis direction).

As illustrated in FIG. 1, the CF board 11a has a cutout extending along a straight line at the outer peripheral portion. Thus, the array board 11b has an arched portion in a plan view that does not overlap the CF board 11a at the outer peripheral portion. A driver (display board driving member) 12 and a flexible board 13 are mounted on the non-overlapping portion. The flexible board 13 includes abase formed of a synthetic resin material having an insulating property and flexibility (e.g., polyimide-based resin). Many wiring patterns (not illustrated) are formed on the base and are each connected to the non-overlapping portion of the array board 11b at one end and connected to a control board (not illustrated), which is a signal supply source, at the other end. The driver 12 is constituted of an LSI chip having a drive circuit therein. The driver 12 operates with response to the signals supplied from the control board, which is a signal supply source, to process the input signals supplied from the control board through the flexible board 13 and produce output signals. The driver 12 outputs the output signals to the source lines 11j in the display area AA and a gate circuit portion 14 in the non-display area NAA.

Figure 5:
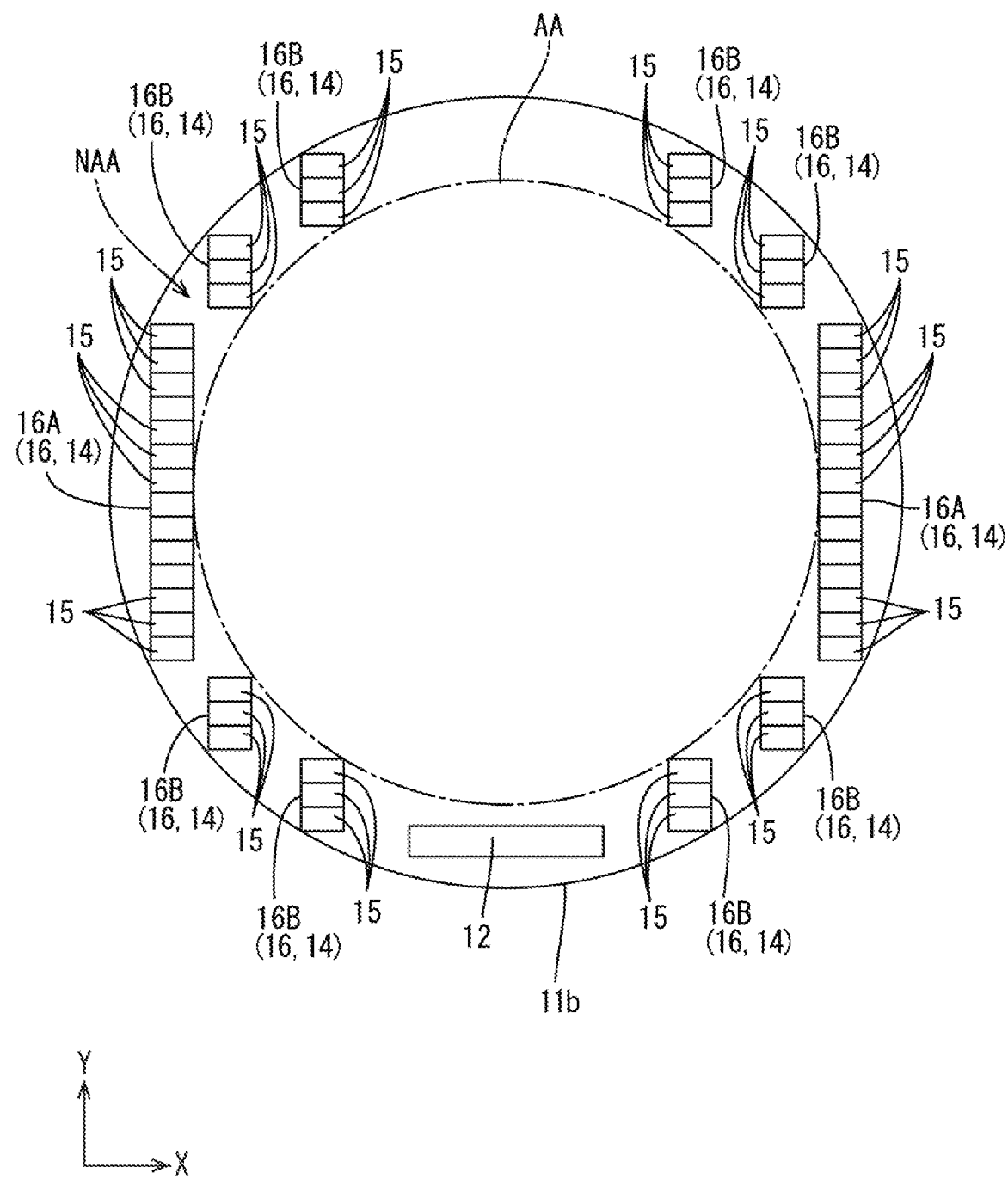
FIG. 5 is a plan view of the array board included in the liquid crystal panel.
Figure 6:
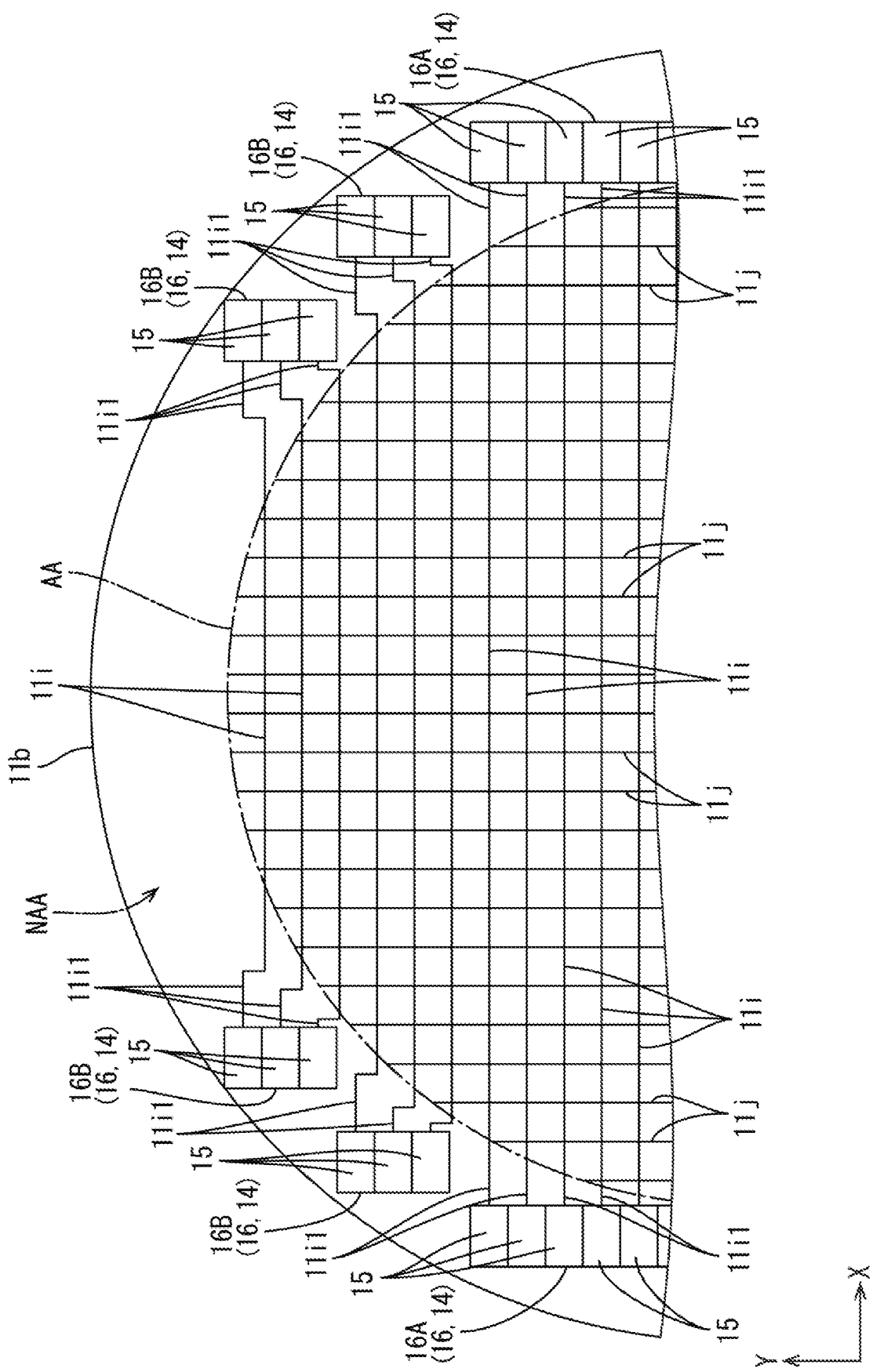
FIG. 6 is a plan view illustrating the magnified array board.

As illustrated in FIG. 5 and FIG. 6, the array board 11b includes gate circuit portions (element drive circuit portions or scan circuit portions) 14 in the non-display area NAA. The gate circuit portion 14 supplies gate signals (scanning signals) to each of the gate lines 11i and scans each of the TFTs 11g to sequentially and selectively drive the TFTs 11g. Two gate circuit portions 14 in the non-display area NAA are arranged in the X-axis direction (the extending direction of the gate lines 11i) with the display area AA therebetween. The two gate circuit portions 14 (unit circuits 15, circuit blocks 16, and block connection lines 17, which will be described later) are connected to the ends in the extending direction of the gate lines 11i. This allows the gate circuit portions 14 to supply gate signals to the gate lines 11i from the ends in the extending direction. Thus, the distortion of the signals is less likely to be caused. The two gate circuit portions 14 are arranged symmetrically in the non-display area NAA as illustrated in FIG. 5. More specifically, the gate circuit portion 14 supplies gate signals sequentially from the most upper gate line 11i to the lowest gate line 11i with respect to the Y-axis direction in FIG. 5 and FIG. 6 in the display area AA. Accordingly, the gate lines 11i that are arranged in the Y-axis direction (the perpendicular direction) are sequentially scanned and a row of the TFTs 11g that are connected to the gate lines 11i is collectively selected sequentially and driven. The scanning direction in which the TFTs 11g are scanned by the gate circuit portion 14 matches the Y-axis direction.

Figure 7:
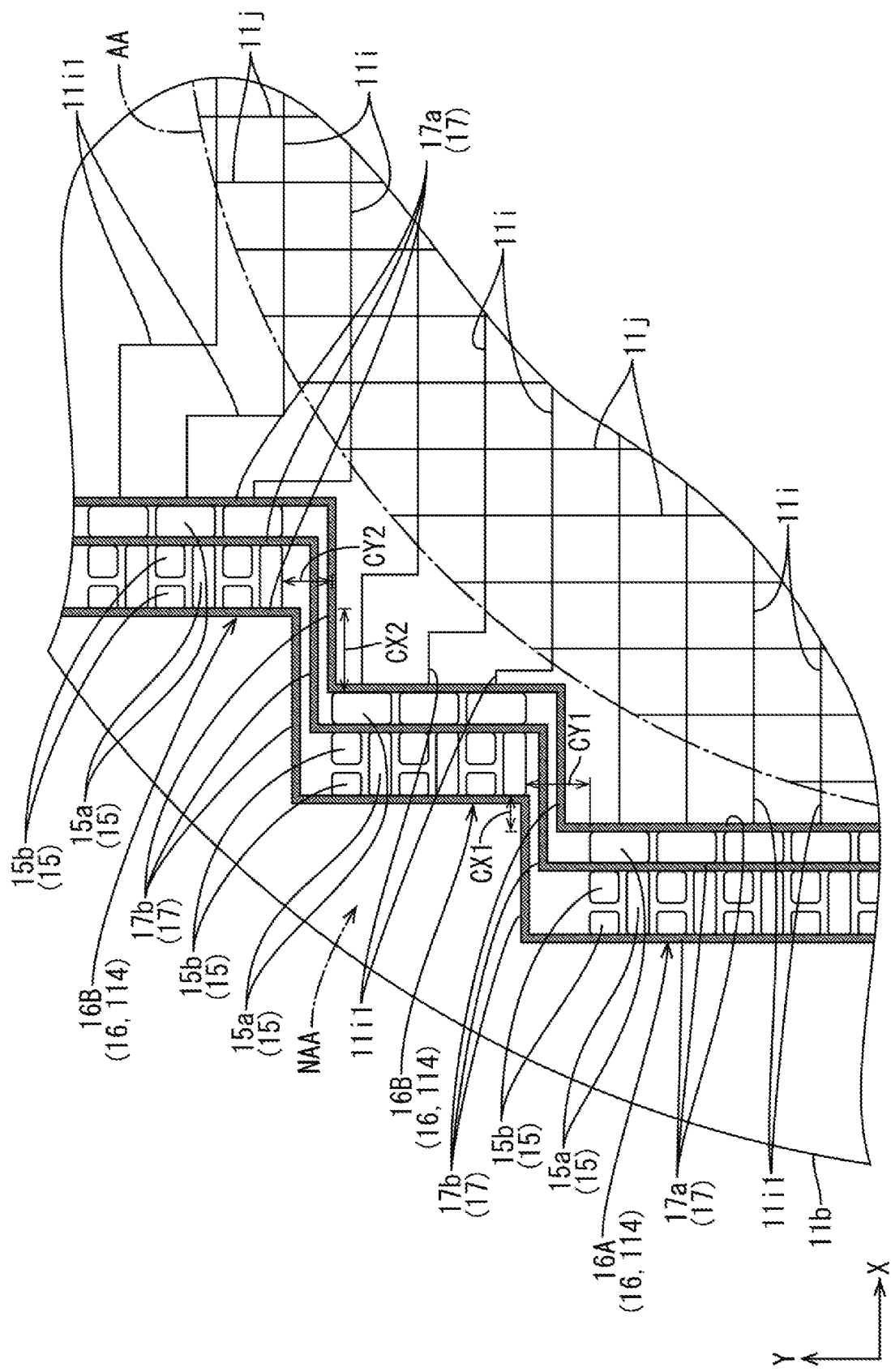
FIG. 7 is a plan view illustrating the further magnified array board.

As illustrated in FIG. 5 to FIG. 7, the gate circuit portions 14 each include circuit blocks 16 disposed in the non-display area NAA and connected to each other through the block connection lines 17. The circuit blocks 16 each include unit circuits 15 linearly arranged. Although the display area AA has a substantially circular shape, i.e., a non-rectangular shape, the unit circuits 15 included in each of the circuit blocks 16 are linearly arranged. Thus, the unit circuits 15 are readily arranged compared with a conventional case where unit circuits are arranged in a curved line along an outline of the display area AA.

As illustrated in FIG. 5 and FIG. 6, the unit circuits 15 each has a horizontally elongated oblong overall shape in a plan view. More specifically described, as illustrated in FIG. 7, the unit circuit 15 includes two first circuit elements 15a each having a substantially oblong shape in a plan view and two second circuit elements 15b each having a substantially square shape in a plan view. The first circuit elements 15a are relatively large and the second circuit elements 15b are relatively small. One of the first circuit elements 15a is disposed such that the long sides thereof extend in parallel to the short sides of the unit circuit 15 and the other one of the first circuit elements 15a is disposed such that the long sides thereof extend in parallel to the long sides of the unit circuit 15. The former is located adjacent to the display area AA and connected to the gate line 11i. The gate line 11i has an extended portion (extended line) 11*i*1 extending from the display area AA to the non-display area NAA. The extended portion 11*i*1 is routed in the non-display area NAA to the first circuit element 15*a* of the unit circuit 15. The two second circuit elements 15*b* are disposed next to each other along the long side of one of the two first circuit elements 15*a* that is not connected to the gate line 11*i*. The unit circuit 15 at least includes a shift register including flip flops (registers) connected to the respective gate lines 11*i*. This enables the unit circuit 15 to sequentially scan the TFTs 11*g*. The unit circuit 15 includes a semiconductor film (an oxide semiconductor material) as a base, which is the same material as the TFT 11*g*, and is formed on the array board 11*b* in a monorhinic form. The unit circuit 15 includes a TFT for a unit circuit (a switching element for a unit circuit) (not illustrated), which includes a semiconductor film, as the channel portion, for example. Thus, the unit circuit 15 is patterned on the array board 11*b* by known photolithography when a semiconductor film or the like is patterned in the production of the array board 11*b*. In addition to the shift resister, the unit circuit 15 may further include a buffer circuit that amplifies the gate signals, for example. In FIG. 6 and FIG. 7, for ease of understanding, only one gate line 11*i* connected to each of the unit circuits 15 is described. However, gate lines 11*i* are connected to each of the unit circuits 15 (e.g., as many gate lines as flip flops included in the unit circuit 15) in the actual configuration.

As illustrated in FIG. 5 and FIG. 6, in each of the circuit blocks 16, the unit circuits 15 are linearly arranged with the long sides of adjacent unit circuits 15 being in contact with each other and the short sides being aligned. The ends in the length direction of the unit circuits 15 included in the respective circuit blocks 16 are flush with each other. As illustrated in FIG. 7, the block connection lines 17 each include block passing portions 17*a* and relay portions 17*b*. The block passing portion 17*a* extends in an arrangement direction of the unit circuits 15 included in the circuit blocks 16 and extends through the circuit blocks 16. The relay portion 17*b* is located between adjacent two of the circuit blocks 16 and is a portion between the block passing portions 17*a*. Thus, the block connection line 17 electrically connects the adjacent circuit blocks 16 to each other. The relay portion 17*b* is bent at two positions at a substantially right angle in accordance with the arrangement of the circuit blocks 16, which are connection targets. The relay portion 17*b* has a substantially crank shape in plan view. Three block connection lines 17 extend parallel to each other. More specifically described, two of the block connection lines 17 are located adjacent to the respective ends in the length direction of the unit circuits 15 included in the circuit blocks 16 and one of the block connection lines 17 extends through the middle in the length direction of the unit circuits 15. The latter block connection line 17 extends between the two first circuit element 15*a* included in the unit circuit 15. The block connection lines 17 are each made of a metal film, which are the same material as the gate lines 11*i* and the source lines 11*j*. The block connection lines 17 are patterned on the array board 11*b* by known photolithography when the gate lines 11*i* and the source lines 11*j* are patterned in the production of the array board 11*b*.

Then, as illustrated in FIG. 5 to FIG. 7, the gate circuit portion 14 in the non-display area NAA includes the circuit blocks 16 that are separated from each other in an oblique direction at an angle relative to the arrangement direction of the unit circuits 15 in which the unit circuits 15 are arranged. More specifically described, adjacent two of the circuit blocks 16 included in the gate circuit portion 14 are located away from each other with a predetermined distance therebetween in the X-axis direction (the extending direction of the gate line 11*i*) and in the Y-axis direction (the perpendicular direction perpendicular to the extending direction of the gate line 11*i*, the arrangement direction of the unit circuits 15). Thus, the circuit blocks 16 are disposed with a predetermined distance therebetween in the oblique direction with respect to the X-axis direction and the Y-axis direction. In this configuration, the block connection lines 17 extending across the circuit blocks 16 to connect the circuit blocks 16 are able to be disposed in spaces between the adjacent circuit blocks 16 that are separated from each other in the oblique direction. This configuration allows the width of the block connection lines 17, the distance between the adjacent block connection lines 17, and the route of the block connection lines 17, for example, to be determined with a high degree of freedom. This eliminates the need of a high-precision production apparatus for forming the circuit blocks 16 and the block connection lines 17 by photolithography on the array board 11*b* (such as an exposure apparatus using a photomask), and requires only a low-precision production apparatus. This reduces the production cost. In this embodiment, the display area AA is an example of the "non-rectangular display area". The display area AA has a curved outline over the entire circumference with a substantially constant curvature over the entire outer circumference.

As illustrated in FIG. 5 and FIG. 6, the circuit blocks 16 include large circuit blocks (middle circuit blocks) 16A each including a relatively large number of unit circuits 15 linearly arranged and small circuit blocks (end circuit blocks) 16B each including a relatively small number of unit circuits 15 linearly arranged. Specifically described, the large circuit block 16A includes fourteen unit circuits 15, and the small circuit block 16B includes three unit circuits 15. Since the large circuit block 16A includes more unit circuits 15 linearly arranged than the small circuit block 16B, the arrangement of the unit circuits 15 is easy compared with a case where the circuit block includes only the small circuit blocks 16B.

As illustrated in FIG. 5 and FIG. 6, the arrangement direction of the unit circuits 15 in the large circuit blocks 16A extends in the Y-axis direction, i.e., the perpendicular direction perpendicular to the extending direction of the gate lines 11*i*. In this configuration, the length of the gate lines 11*i* connected to the unit circuits 15, which are included in the large circuit blocks 16A, is readily made short compared with a case where the arrangement direction of the unit circuits included in the large circuit block extends in the X-axis direction (the extending direction of the gate lines 11*i*). Specifically described, the gate lines 11*i* connected to the unit circuits 15 included in the large circuit block 16A each have the extended portion 11*i*1 extending in the X-axis direction and extend substantially linearly in the X-axis direction over the entire length. Thus, the length of the extended portions 11*i*1 is minimized. This allows the gate lines 11*i* to be efficiently arranged. The unit circuits 15 included in the large circuit blocks 16A are disposed such that the length direction thereof matches the X-axis direction and the width direction thereof matches the Y-axis direction. As illustrated in FIG. 5 and FIG. 7, the block passing portions 17*a* of the block connection line 17 extending through the large circuit blocks 16A extend in the Y-axis direction, which is the arrangement direction of the unit circuits 15. The block passing portion 17*a* that is closest to the display area AA substantially matches a tangent line to the display area AA, which is normal to a line extending in the X-axis direction through the center of the display area AA.

Here, as illustrated in FIG. 5, since the above-described display area AA of the embodiment has a substantially circular shape in a plan view, the dimension of the display area AA in the X-axis direction (the extending direction of the gate lines 11*i*) varies with positions in the Y-axis direction (the perpendicular direction perpendicular to the extending direction of the gate lines 11*i*) and the dimension thereof in the Y-axis direction varies with positions in the X-axis direction. Specifically described, the dimension of the display area AA in the X-axis direction is maximum at the center in the Y-axis direction and is minimum at the ends in the Y-axis direction. In the same way, the dimension of the display area AA in the Y-axis direction is maximum at the center in the X-axis direction and is minimum at the ends in the X-axis direction. In this configuration, the large circuit block 16A is located at a position in the Y-axis direction where the display area AA has the maximum dimension in the X-axis direction, i.e., at the center. Specifically described, the center of the large circuit block 16A in the arrangement direction of the unit circuits 15 (the Y-axis direction) corresponds to the center of the display area AA in the Y-axis direction. In this configuration, the large circuit block 16A is efficiently arranged in the non-display area NAA, allowing the frame size to be favorably reduced.

As illustrated in FIG. 5 and FIG. 6, the small circuit blocks 16B are each disposed such that the arrangement direction of the unit circuits 15 extends in the Y-axis direction, i.e., in the perpendicular direction perpendicular to the extending direction of the gate lines 11*i*. Thus, the unit circuits 15 in all the large circuit blocks 16A and the small circuit blocks 16B, which are included in the circuit block 16 according to the embodiment, are arranged in the Y-axis direction. This allows the unit circuits 15 in the circuit block 16 to be readily arranged. The unit circuits 15 included in the small circuit blocks 16B are disposed such that the length direction matches the X-axis direction and the width direction matches the Y-axis direction.

As illustrated in FIG. 5 and FIG. 6, the small circuit blocks 16B are located closer to the edges of the non-display area NAA in the Y-axis direction than the large circuit blocks 16A, which are located at the middle. With this configuration, the large circuit blocks 16A and the small circuit blocks 16B are efficiently arranged in the non-display area NAA, allowing the frame size to be reduced. Specifically described, in one gate circuit portion 14, two small circuit blocks 16B are located on each side of the large circuit block 16A in the Y-axis direction with a distance from the large circuit block 16A. As illustrated in FIG. 7, a distance CX1 between the small circuit block 16B that is adjacent to the large circuit block 16A and the large circuit block 16A in the X-axis direction is smaller than a distance CY1 therebetween in the Y-axis direction. A distance CX2 between the adjacent small circuit blocks 16B in the X-axis direction is larger than a distance CY2 therebetween in the Y-axis direction.

Furthermore, as illustrated in FIG. 5 and FIG. 6, the two small circuit blocks 16B located on the sides of the large circuit block 16A in the Y-axis direction with a distance from the large circuit block 16A are symmetrically arranged in the Y-axis direction. With this configuration, the unit circuits 15 in each of the two small circuit blocks 16B are readily arranged. Furthermore, as illustrated in FIG. 7, the gate lines 11*i* connected to the unit circuits 15 included in the small circuit blocks 16B are each bent at two positions at a substantially right angle at the middle in accordance with the arrangement of the unit circuits 15 to which the extended portions 11*i*1 thereof are connected. The gate lines 11*i* each have a substantially crank shape in plan view.

As described above, the array board (display board) 11*b* of the embodiment includes a display area AA having a non-rectangular shape, TFTs (display elements) 11*g* disposed in the display area AA, gate lines (element connection lines) 11*i* disposed at least in the display area AA and connected to the TFTs 11*g*, a non-display area NAA surrounding the display area AA, unit circuits 15 disposed in the non-display area NAA and connected to the element connection lines 11*i*, and a block connection line 17. The unit circuits 15 are linearly arranged in the non-display area NAA to form circuit blocks 16. The circuit blocks 16 in the non-display area NAA form a gate circuit portion (an element drive circuit portion) 14 in which at least two of the circuit blocks 16 are away from each other in an oblique direction with respect to an arrangement direction of the unit circuits 15 in which the unit circuits 15 are arranged. The block connection line 17 extends across the circuit blocks 16 in the non-display area NAA and connected to the circuit blocks 16.

As described above, the gate circuit portion 14 includes the circuit blocks 16 disposed in the non-display area NAA, and the circuit blocks 16 each include the unit circuits 15 linearly arranged. Signals are sent from the unit circuits 15 to the TFTs 11*g* in the display area AA through the gate lines 11*i* to drive the TFTs 11*g*.

The display area AA has a non-rectangular shape, and the unit circuits 15 included in each of the circuit blocks 16 are linearly arranged. Thus, the unit circuits 15 are readily arranged compared with a conventional case where the unit circuits 15 are arranged in a curved line along the outline of the display area AA. Furthermore, some of the circuit blocks 16 in the gate circuit portion 14 are away from each other in an oblique direction with respect to the arrangement direction of the unit circuits 15. Thus, the block connection lines 17 extending across the circuit blocks 16 and connected to the circuit blocks 16 are able to be arranged in the oblique spaces between the adjacent circuit blocks 16. This allows the block connection lines 17 to be designed with a high degree of freedom, eliminating the need of a high-precision production apparatus for forming the circuit blocks 16 and the block connection lines 17 by photolithography or other methods and requires only a low-precision production apparatus. This reduces the production cost. Examples of the "non-rectangular display area AA" include a "display area AA having an outline at least partly curved" and a "display area AA having a polygonal outline having an acute or obtuse interior angle".

Furthermore, the circuit blocks 16 include the large circuit block 16A having a relatively large number of unit circuits 15 and the small circuit block 16B having a relatively small number of unit circuits 15. In this configuration, the large circuit block 16A includes more unit circuits 15 arranged in a straight line than the small circuit block 16B. Thus, the unit circuits 15 are readily arranged compared with a case where the circuit blocks 16 include only the small circuit blocks 16B.

Furthermore, the arrangement direction of the unit circuits 15 in the large circuit block 16A extends in the perpendicular direction that is perpendicular to the extending direction of the gate lines 11*i*. This configuration allows the gate lines 11*i* connected to the unit circuits 15 included in the large circuit block 16A to be short compared with a case where the unit circuits 15 in the large circuit block 16A are arranged in the extending direction of the gate lines 11$i$. Thus, the gate lines 11$i$ are efficiently arranged.

Furthermore, the display area AA has a dimension in the extending direction that varies with positions in the perpendicular direction. The large circuit block 16A is located at a position in the perpendicular direction where the dimension of the display area AA in the extending direction is maximum. In this configuration, the large circuit block 16A is efficiently arranged in the non-display area NAA, allowing the frame size to be favorably reduced.

Furthermore, the display area AA has a circular shape in a plan view, and the large circuit block 16A is located at the middle in the perpendicular direction and the small circuit blocks 16B are located at the ends in the perpendicular direction. In this configuration, the large circuit blocks 16A and the small circuit blocks 16B are efficiently arranged in the non-display area NAA, allowing the frame size to be further favorably reduced.

Furthermore, the small circuit blocks 16B are symmetrically arranged in the perpendicular direction. In this configuration, the unit circuits 15 in the small circuit blocks 16B are readily arranged.

Furthermore, the arrangement direction of the unit circuits 15 in the small circuit blocks 16B extends in the perpendicular direction. In this configuration, the arrangement direction of the unit circuits 15 in the large circuit blocks 16A and that in the small circuit blocks 16B are the same, allowing the unit circuits 15 to be further readily arranged.

Furthermore, the liquid crystal panel (display device) 11 of the embodiment includes the above-described array board 11$b$ and the CF substrate (counter substrate) 11$a$ facing the array board 11$b$. Since the unit circuits 15 in the array board 11$b$ are readily arranged, the liquid crystal panel 11 having such a configuration is able to be produced at a lower cost.

Second Embodiment

A second embodiment of the invention is described with reference to FIG. 8 to FIG. 10. In the second embodiment, the arrangement of small circuit blocks 116B is different. Configurations, operations, and effects similar to those of the first embodiment are not described.

Figure 8:
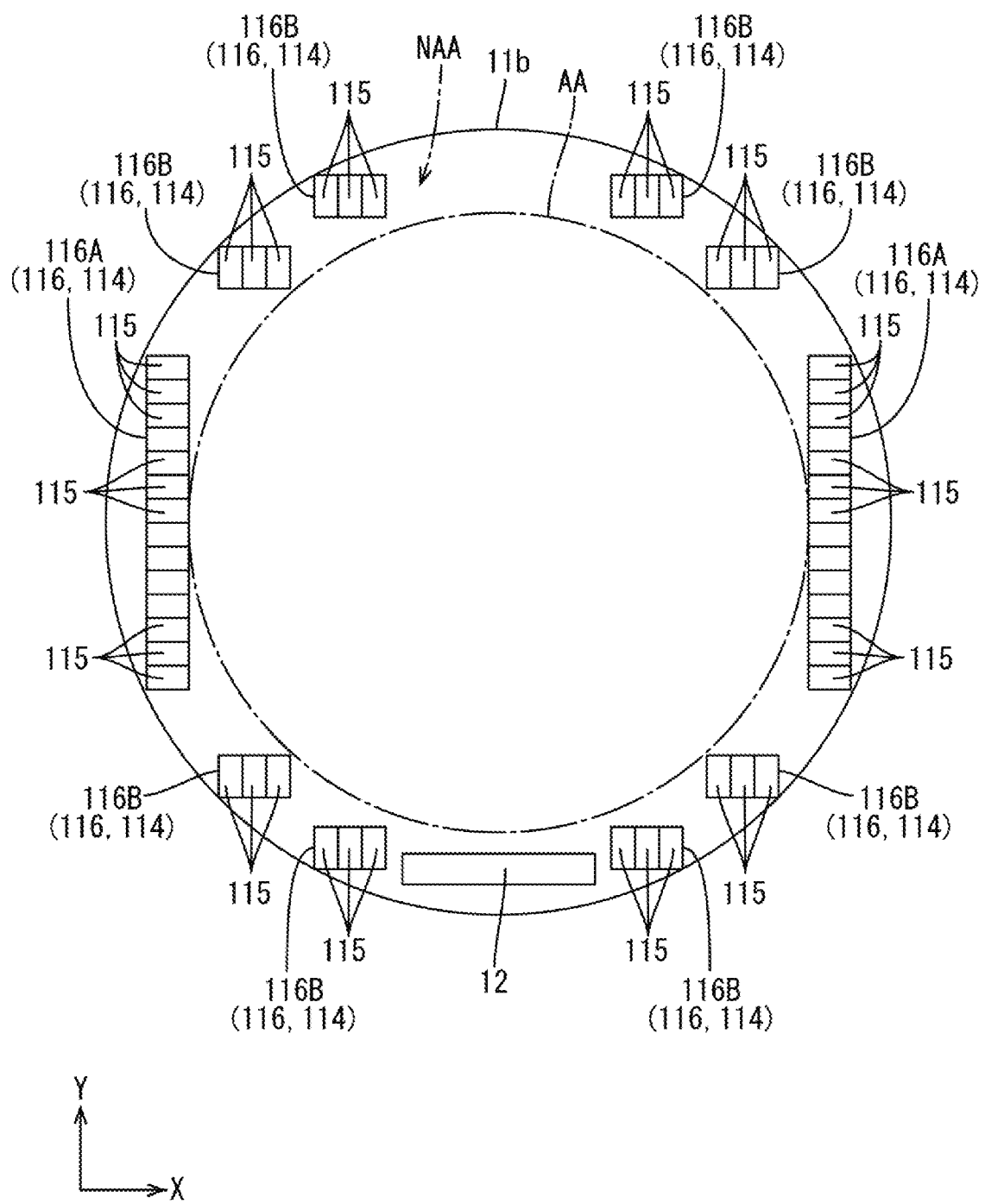
FIG. 8 is a plan view of an array board of a liquid crystal panel according to a second embodiment of the invention.
Figure 9:
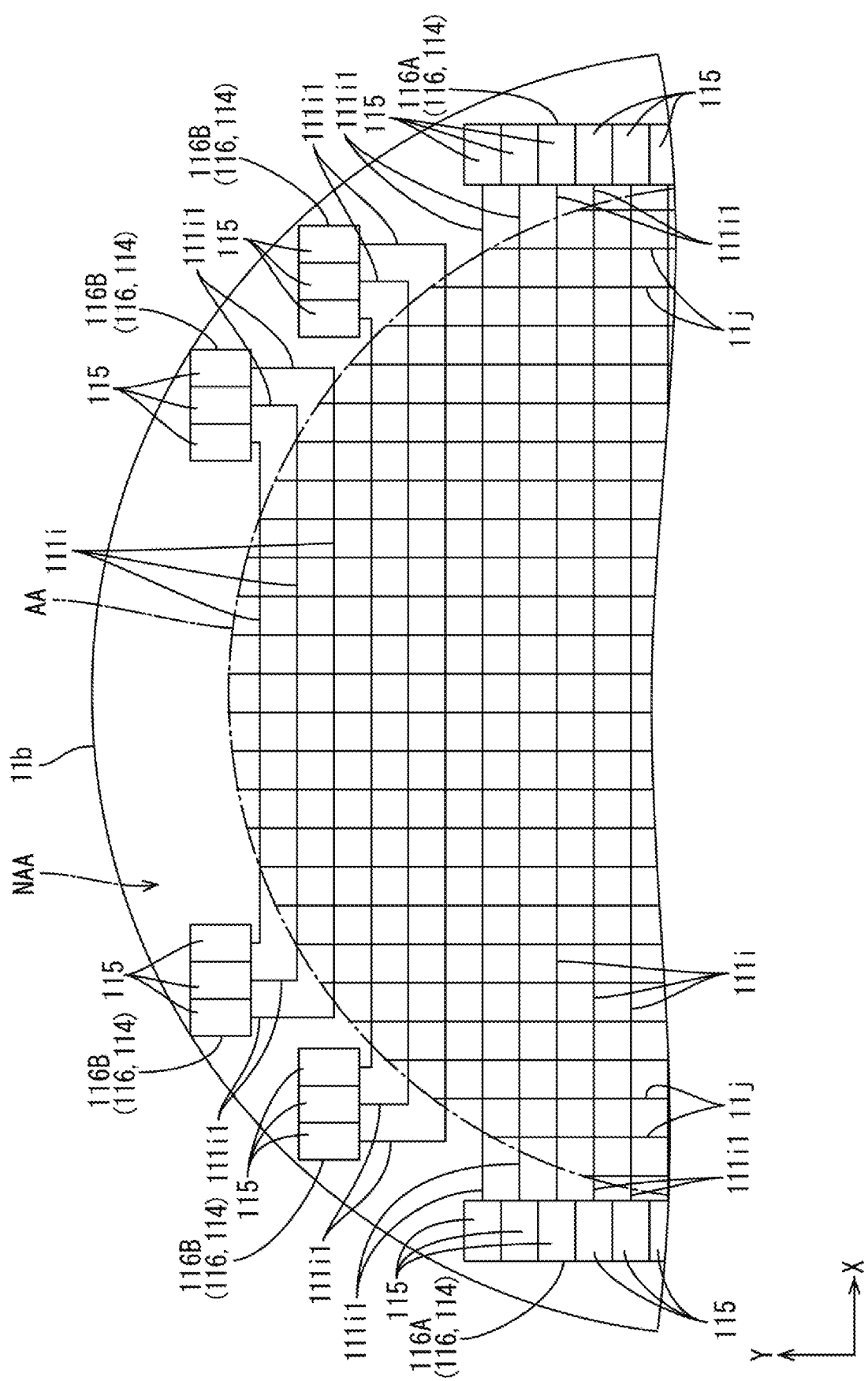
FIG. 9 is a plan view illustrating the magnified array board.

As illustrated in FIG. 8 and FIG. 9, in the small circuit blocks 116B of the embodiment, the arrangement direction of the unit circuits 115 extends in the X-axis direction, i.e., in the extending direction of the gate lines 111$i$. The unit circuits 115 included in each of the small circuit blocks 116B are arranged such that the length direction matches the Y-axis direction (the perpendicular direction perpendicular to the extending direction of the gate lines 111$i$) and the width direction matches the X-axis direction. In other words, the unit circuits 115 included in the small circuit blocks 116B are turned by about 90 degrees in relation to the unit circuits 115 included in the large circuit block 116A. Specifically described, the unit circuits 115 included in the small circuit block 116B are arranged such that the length direction matches the width direction of the unit circuits 115 included in the large circuit block 116A and the width direction matches the length direction of the unit circuits 115 included in the large circuit block 116A.

Figure 10:
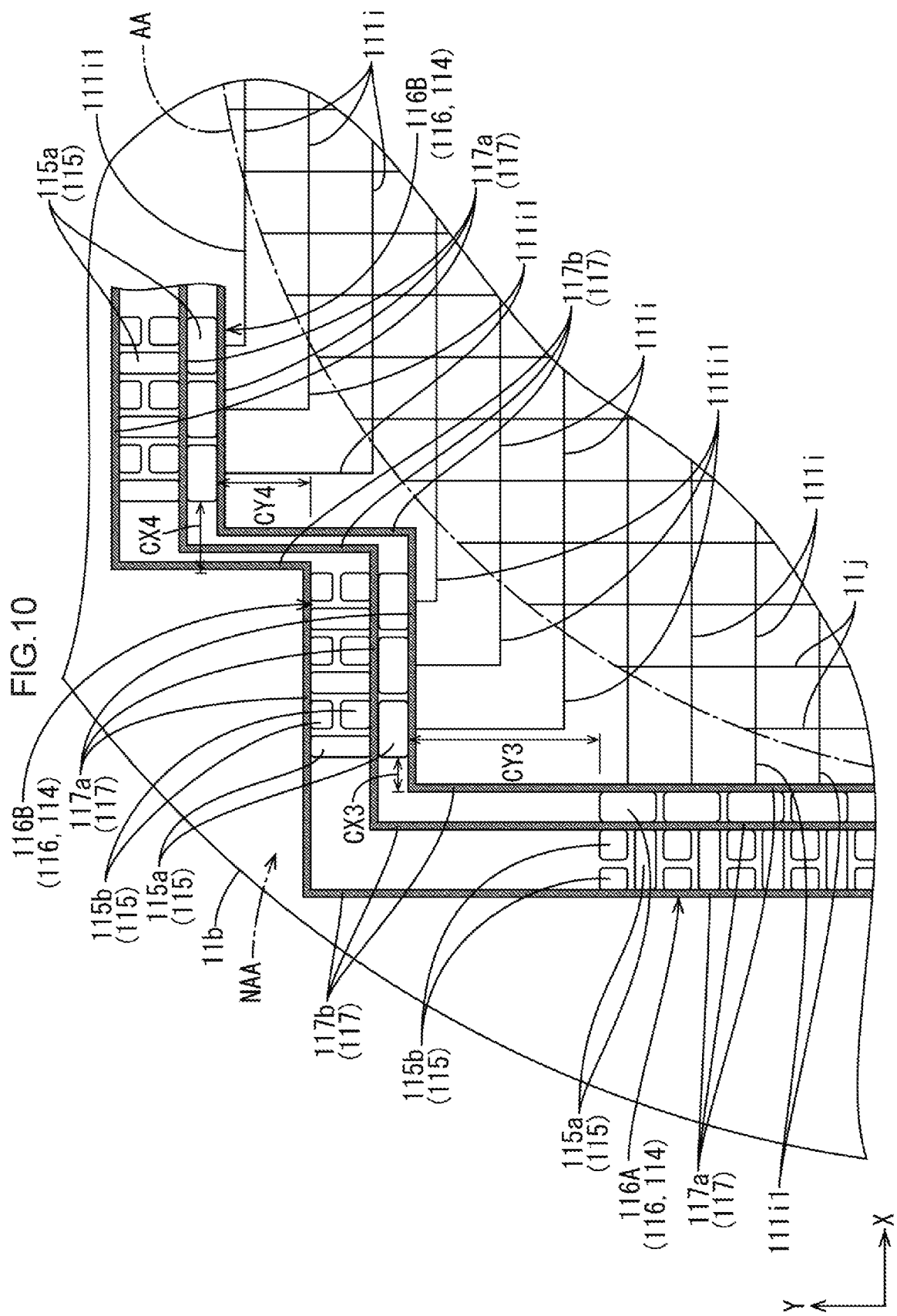
FIG. 10 is a plan view illustrating the further magnified array board.

In the above-described arrangement of the unit circuits 115 included in the small circuit block 116B, as illustrated in FIG. 10, one of two first circuit elements 115$a$ in each unit circuit 115 that is connected to the gate line 111$i$ has a long side extending in the X-axis direction, which is a connection target of the extended portion 111$i$1. Thus, the extended portions 111$i$1 of the gate lines 111$i$ connected to the respective unit circuits 115 included in the small circuit blocks 116B are each bent at a substantially right angle at one position at the middle in accordance with the arrangement of the first circuit element 115$a$ of each of the unit circuits 115, which is a connection target of the extended portion 111$i$1. The extended portions 111$i$1 each have an L-like shape in plan view. Since the extended portions 111$i$1 of the gate lines 111$i$ according to the embodiment each have a substantially L-like shape in plan view, the shape in plan view is simple, not as complex as that in the first embodiment having a substantially crank shape in plan view (see FIG. 7). This configuration allows the gate lines 111$i$ to be shorter, and thus the gate lines 111$i$ are efficiently arranged.

In this embodiment, as illustrated in FIG. 10, a distance CX3 between the small circuit block 116B that is adjacent to the large circuit block 116A and the large circuit block 116A in the X-axis direction is smaller than a distance CY3 therebetween in the Y-axis direction. A distance CX4 between the adjacent small circuit blocks 116B in the X-axis direction is smaller than a distance CY4 therebetween in the Y-axis direction. Relay portions 117$b$ of the block connection lines 117 connecting the adjacent circuit blocks 116 are routed in the spaces having the distances CX3, CY3, CX4, and CY4 in a substantially L-like shape in plan view. The block connection lines 117 each include a block passing portion 117$a$ extending in the Y-axis direction through the large circuit block 116A and block passing portions 117$a$ each extending in the X-axis direction through the small circuit block 116B. Thus, the block connection lines 117 are arranged with a high degree of freedom as in the above-described first embodiment, and thus the production cost is favorably reduced.

As described above, in the above-described embodiment, the large circuit blocks 116A are each arranged at the middle in the perpendicular direction in the non-display area NAA and the small circuit blocks 116B are arranged at the ends in the perpendicular direction in the non-display area NAA. The arrangement direction of the unit circuits 115 in the small circuit blocks 116B extends in the extending direction. This configuration readily allows the gate lines 111$i$ connected to the small circuit blocks 116B to be short compared with a case where the arrangement direction of the unit circuits included in the small circuit blocks extends in the perpendicular direction, which is the same as the arrangement direction of the unit circuits 115 included in the large circuit blocks 116A. Thus, the gate lines 111$i$ are efficiently arranged.

Third Embodiment

A third embodiment of the invention is described with reference to FIG. 11 or FIG. 12. In the third embodiment, the number of gate circuit portions 214 is different from that in the first embodiment. Configurations, operations, and effects similar to those of the first embodiment are not described.

Figure 11:
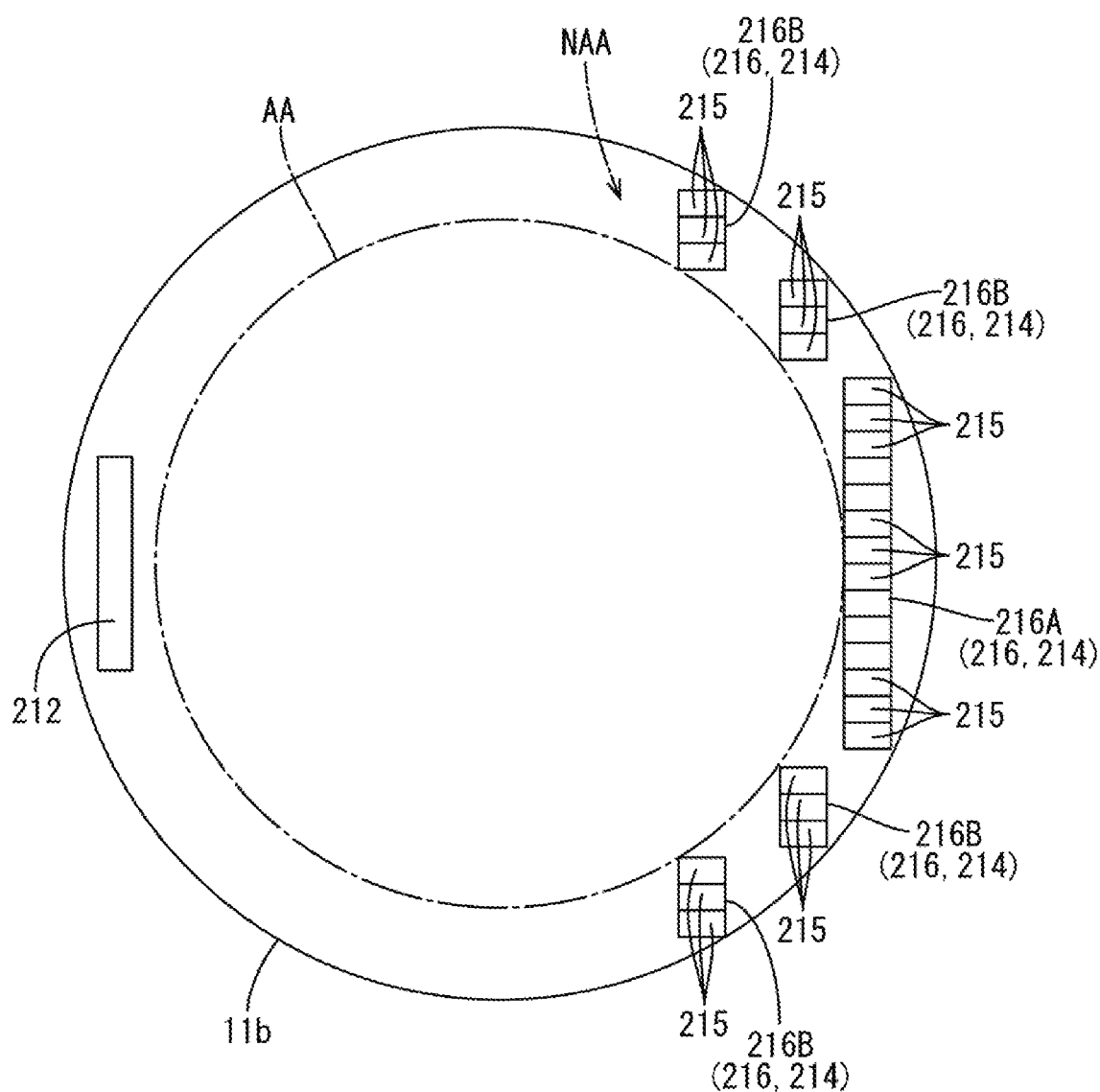
FIG. 11 is a plan view of an array board of a liquid crystal panel according to a third embodiment of the invention.
Figure 12:
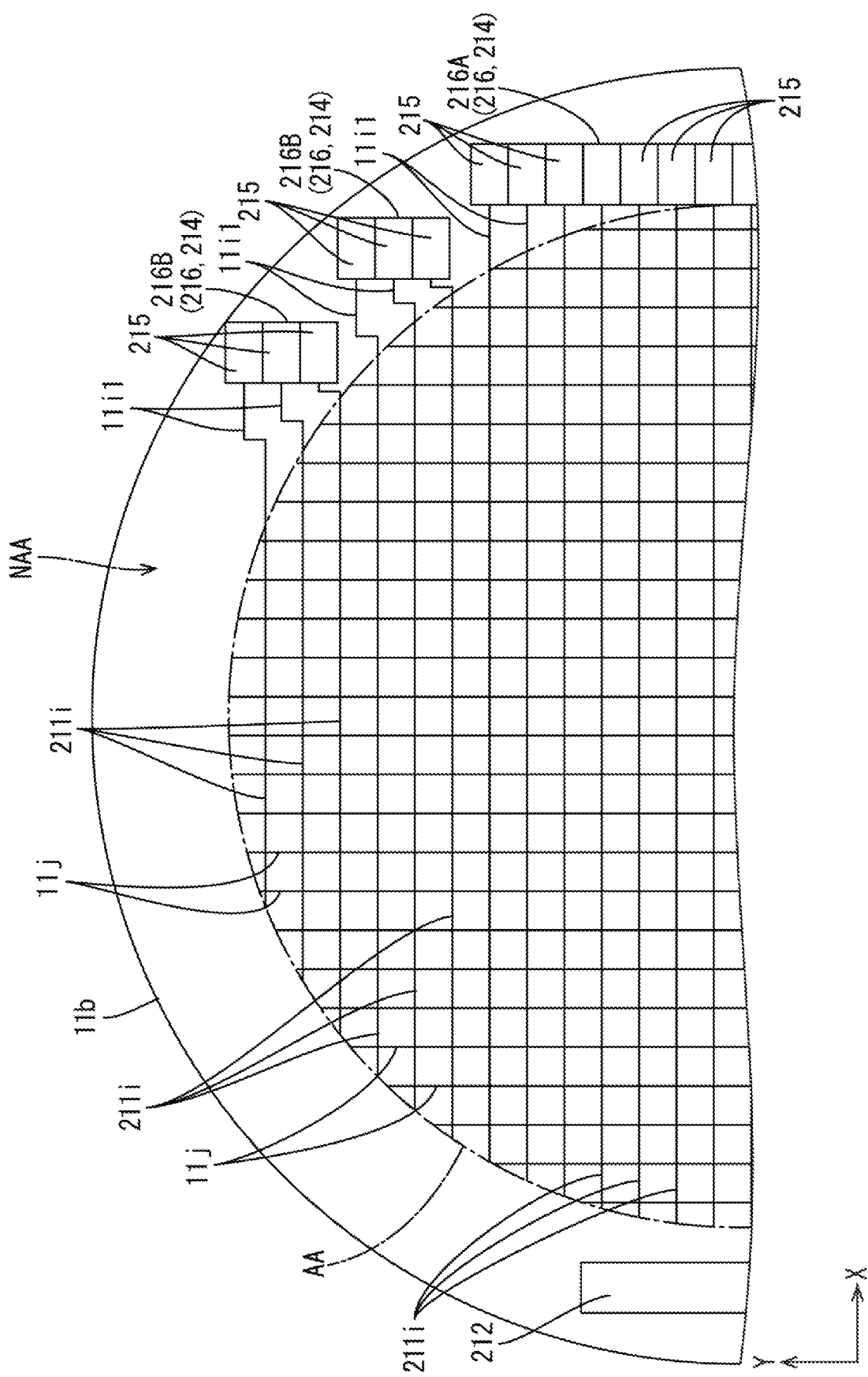
FIG. 12 is a plan view illustrating the magnified array board.

As illustrated in FIG. 11, the gate circuit portion 214 according to this embodiment is disposed in the non-display area NAA only on one side of the display area AA in the X-axis direction (the right side in FIG. 11). As illustrated in FIG. 12, unit circuits 215 in circuit blocks 216 (a large circuit block 216A and small circuit blocks 216B) included in the gate circuit portion 214 are each connected to one of the ends of gate lines 211$i$ in the extending direction such that gate signals are supplied to each of the gate lines 211$i$ from the end in the extending direction. As illustrated in FIG. 11, a driver 212 is disposed such that the display area AA is located between the driver 212 and the gate circuit portion 214 in the X-axis direction. In other words, the driver 212 in this embodiment is located in the area where the gate circuit portion 14 is disposed in the first embodiment (the area on the left of the display area AA in FIG. 5).

Fourth Embodiment

A fourth embodiment of the invention is described with reference to FIG. 13 or FIG. 14. In the fourth embodiment, the number of gate circuit portion 314 is different from that in the second embodiment. Configurations, operations, and effects similar to those of the second embodiment are not described.

Figure 13:
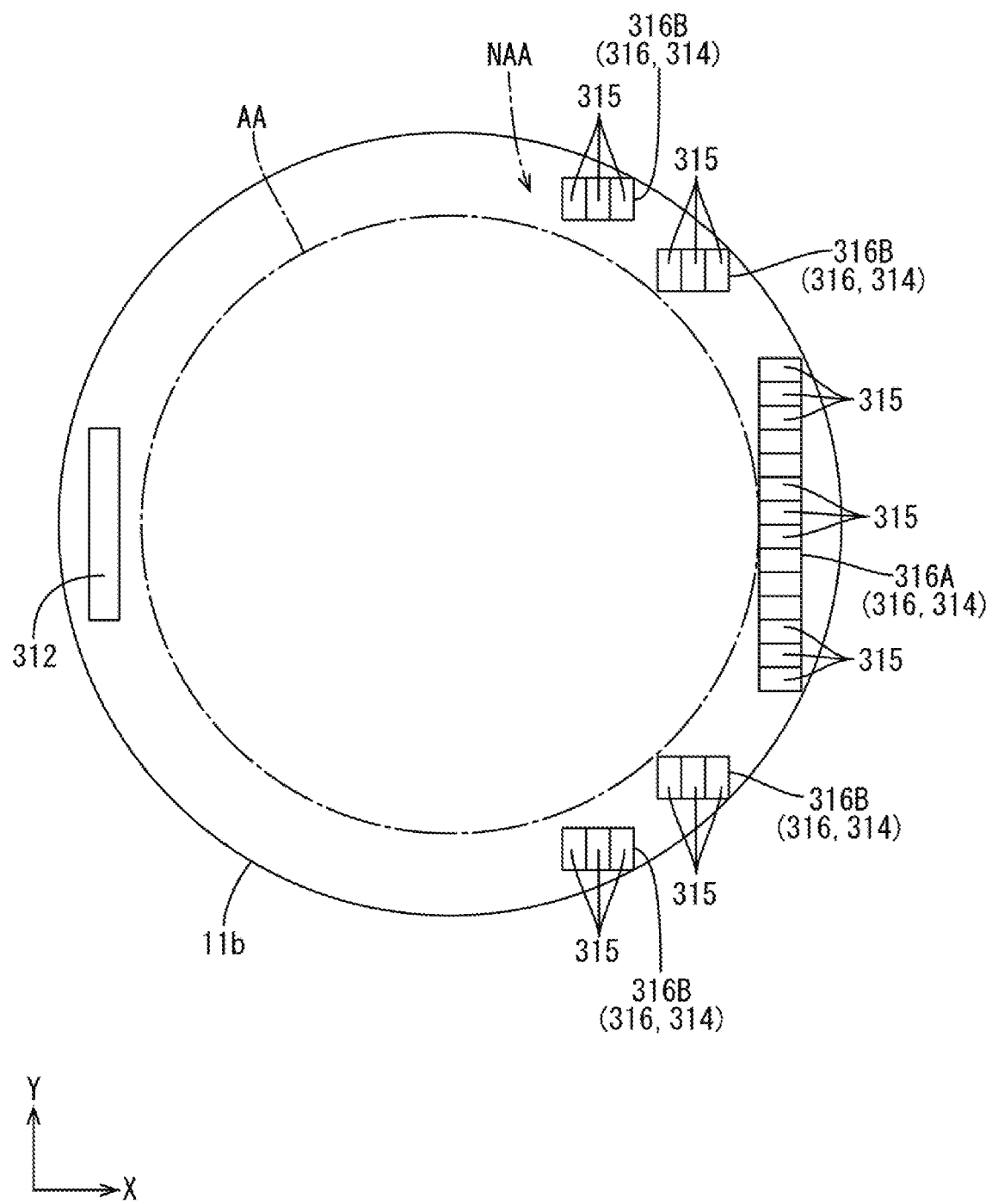
FIG. 13 is a plan view of an array board of a liquid crystal panel according to a fourth embodiment of the invention.
Figure 14:
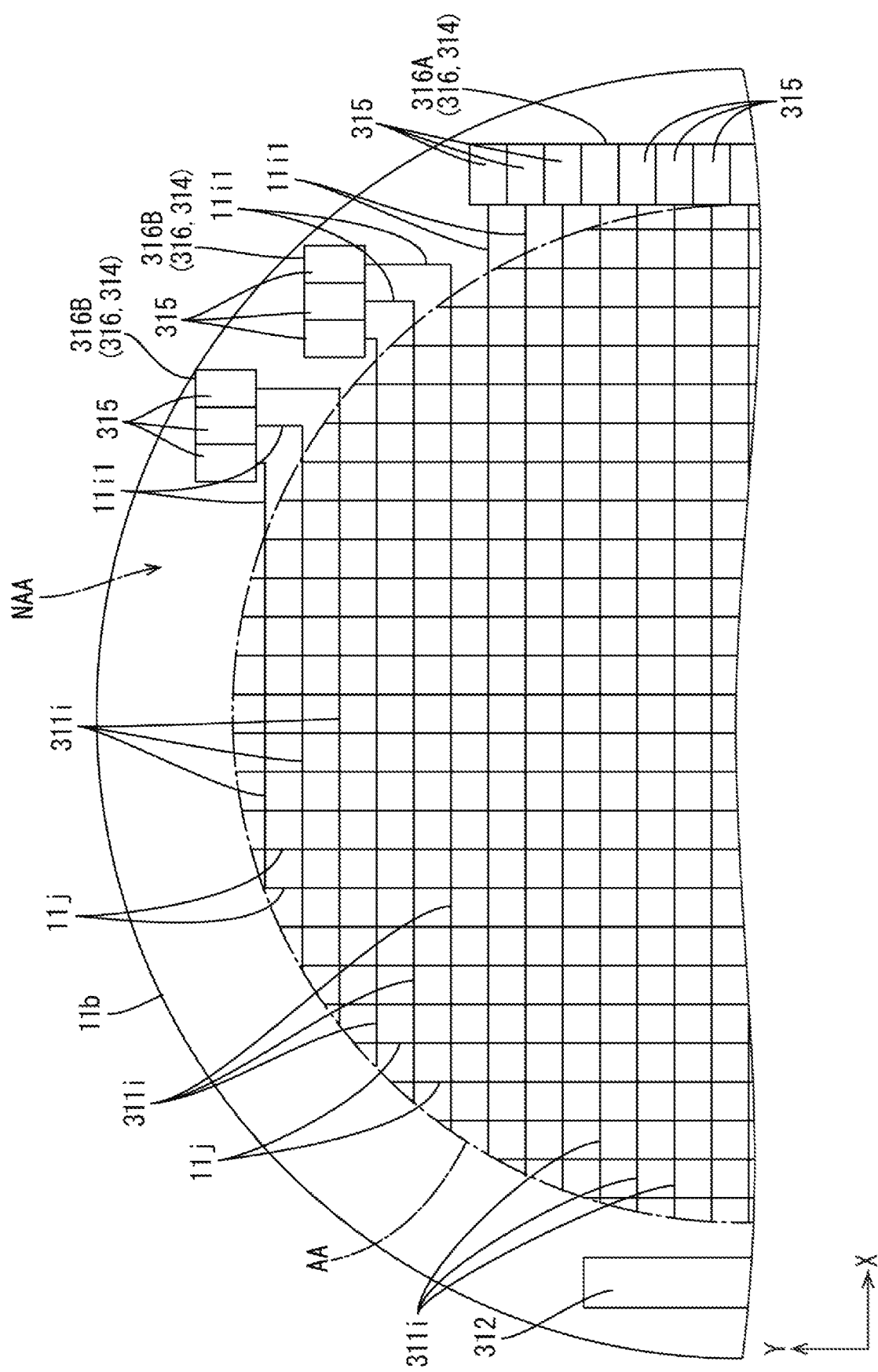
FIG. 14 is a plan view illustrating the magnified array board.

As illustrated in FIG. 13, the gate circuit portion 314 according to the embodiment is located in the non-display area NAA only on one side (the right side in FIG. 13) of the display area AA in the X-axis direction. As illustrated in FIG. 14, unit circuits 315 of circuit blocks 316 (a large circuit block 316A and small circuit blocks 316B) included in the gate circuit portion 314 are each connected to one of the ends of gate lines 311*i* in the extending direction such that gate signals are supplied to each of the gate lines 311*i* from the end in the extending direction. As illustrated in FIG. 13, a driver 312 is disposed such that the display area AA is located between the driver 312 and the gate circuit portion 314 in the X-axis direction. In other words, the driver 312 in this embodiment is located in the area where the gate circuit portion 114 is disposed in the second embodiment (the area on the left of the display area AA in FIG. 8).

Fifth Embodiment

A fifth embodiment of the invention is described with reference to FIG. 15. In the fifth embodiment, an array board 411*b* has a shape in a plan view different from that of the first embodiment. Configurations, operations, and effects similar to those of the first embodiment are not described.

Figure 15:
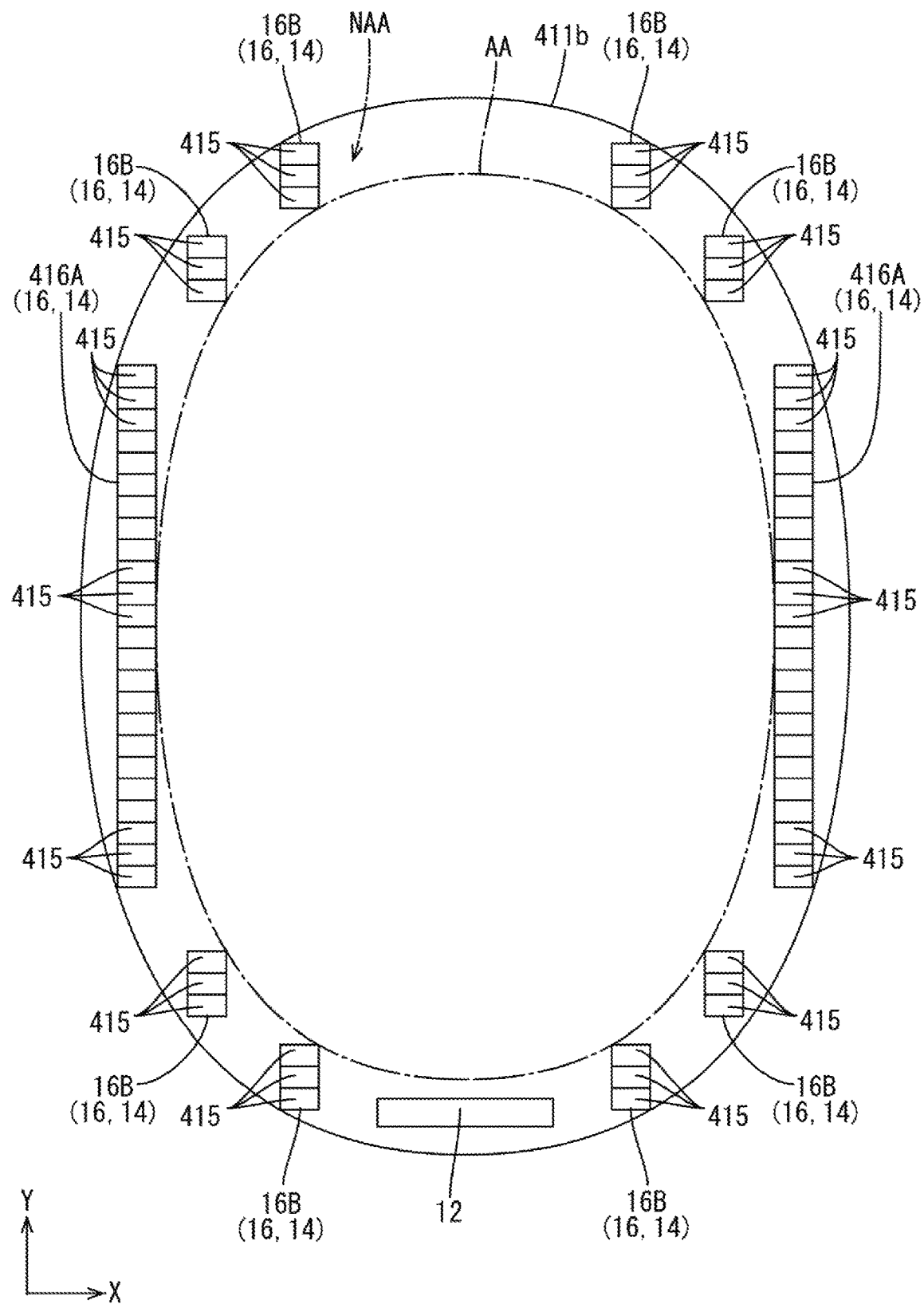
FIG. 15 is a plan view of an array board of a liquid crystal panel according to a fifth embodiment of the invention.

As illustrated in FIG. 15, the array board 411*b* of this embodiment has a substantially elliptical shape elongated in a vertical direction in a plan view. Thus, the display area AA of the array board 411*b* has a substantially elliptical shape having the major axis extending in the Y-axis direction and the minor axis extending in the X-axis direction. The non-display area NAA surrounding the display area AA also has a substantially elongated annular shape in a plan view that corresponds to the shape of the display area AA. As described above, since the non-display area NAA has the substantially elongated annular shape having the major axis extending in the Y-axis direction and the minor axis extending in the X-axis direction, large circuit blocks 416A arranged in the non-display area NAA each have a larger dimension in the Y-axis direction and include more unit circuits 415 arranged in the Y-axis direction than those in the first embodiment. Specifically described, the number of unit circuits 415 included in the large circuit block 416A is twenty-four. In this embodiment, the display area AA is an example of the "non-rectangular display area". The display area AA has a curved outline over the entire circumference with a non-constant curvature.

Sixth Embodiment

A sixth embodiment of the invention is described with reference to FIG. 16. In the sixth embodiment, circuit blocks 516 are different from those in the first embodiment. Configurations, operations, and effects similar to those of the first embodiment are not described.

Figure 16:
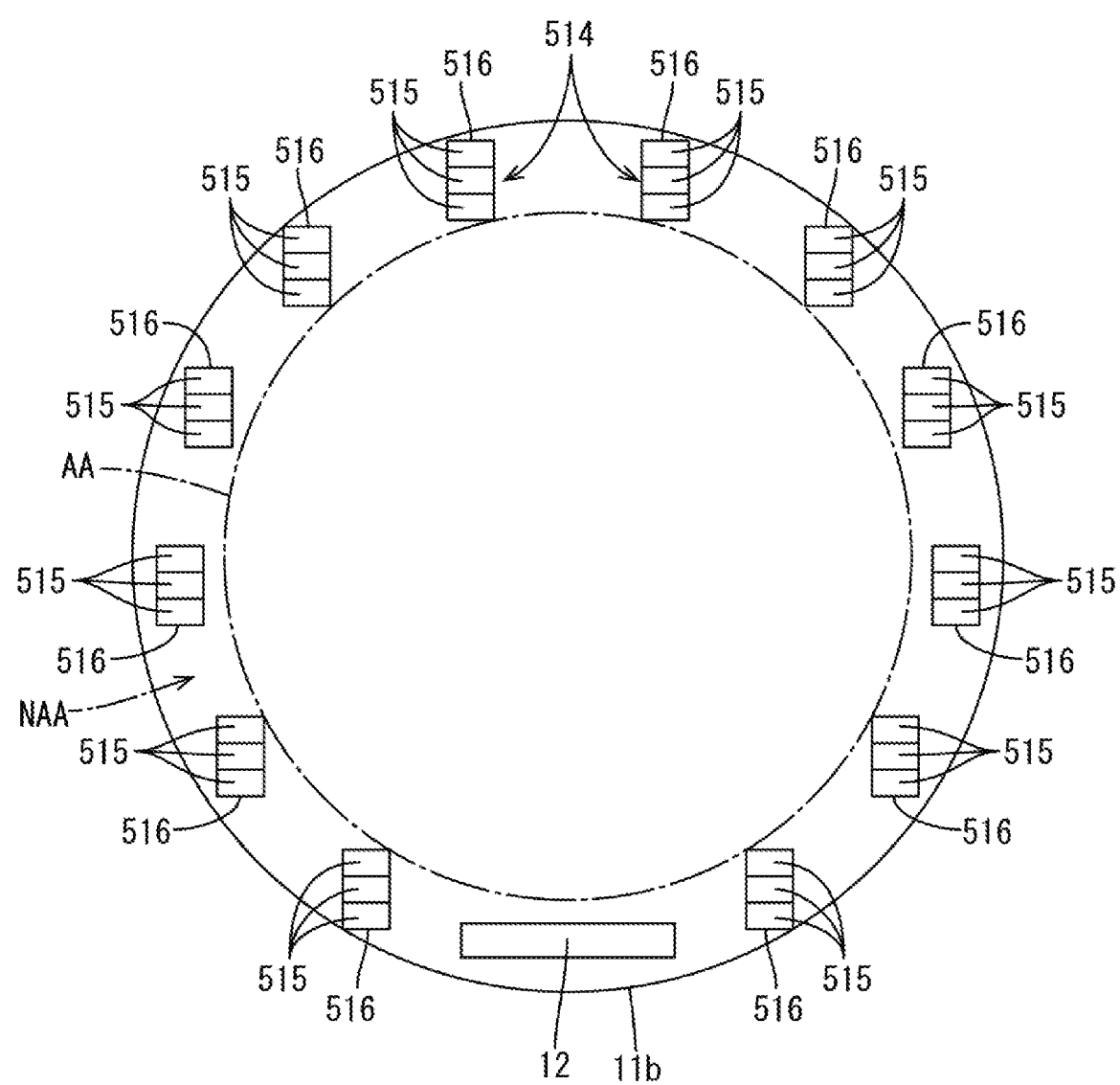
FIG. 16 is a plan view of an array board of a liquid crystal panel according to a sixth embodiment of the invention.

As illustrated in FIG. 16, each of the circuit blocks 516 of this embodiment includes the same number of unit circuits 515. Specifically described, in this embodiment, the number of unit circuits 515 included in each of the circuit blocks 516 is three. In other words, the number of unit circuits 515 included in each of the circuit blocks 516 is equal to the number of unit circuits 15 included in each of the small circuit blocks 16B in the first embodiment (see FIG. 5). Thus, the number of circuit blocks 516 included in a gate circuit portion 514 is larger than the number of circuit blocks 16 included in the gate circuit portion 14 in the first embodiment, specifically six. In such a configuration in which each of the circuit blocks 516 includes the same number of unit circuits 515, the circuit blocks 516 are arranged with a space therebetween in an oblique direction with respect to the X-axis direction and the Y-axis direction. Thus, block connection lines (not illustrated) connected to the circuit blocks 516 are able to be located in the spaces. This allows the block connection lines to be arranged with a high degree of freedom, leading to a reduction in the production cost.

Other Embodiments

The present invention is not limited to the embodiments described above and illustrated by the drawings. For example, the following embodiments will be included in the technical scope of the present invention.

(1) The distances between the adjacent circuit blocks may be changed from those described in the embodiments as necessary. For example, in the configuration of the first embodiment, the distances may satisfy "CX1>CY1" or "CY2>CX2". In the similar way, in the configuration of the second embodiment, the distances may satisfy "CX3>CY3" or "CX4>CY4".

(2) In the first to fifth embodiments, the large circuit blocks are symmetrically arranged, and the small circuit blocks are symmetrically arranged. However, at least one of the large circuit block and the small circuit block may be asymmetrically arranged.

(3) In the first to fifth embodiments, in the non-display area, the large circuit block is located at the middle in the Y-axis direction and the small circuit blocks are located at the ends in the Y-axis direction. However, in the non-display area, the small circuit blocks may be located at the middle in the Y-axis direction and the large circuit block may be located at the end in the Y-axis direction.

(4) In the first to fifth embodiment, the center of the large circuit block in the Y-axis direction substantially matches the center of the display area in the Y-axis direction. However, the center of the large circuit block in the Y-axis direction may be displaced from the center of the display area in the Y-axis direction. In other words, the large circuit block may be eccentric in relation to the display area.

(5) In the first to fifth embodiments, one large circuit block is included in one gate circuit portion. However, two or more large circuit blocks may be included in one gate circuit portion.

(6) In the first to fifth embodiments, four small circuit blocks are included in one gate circuit portion. However, three or fewer small circuit blocks or five or more small circuit blocks may be included in one gate circuit portion.

(7) In the sixth embodiment, six circuit blocks are included in one gate circuit portion. However, five or fewer circuit blocks or seven or more circuit blocks may be included in one gate circuit portion.

(8) In the first to fifth embodiments, fourteen or twenty-four unit circuits are included in the large circuit block. However, thirteen or fewer unit circuits, fifteen to twenty-three unit circuits, or twenty-five or more unit circuits may be included in the large circuit block.

(9) In the first to fifth embodiments, three unit circuits are included in each of the small circuit blocks. However, two or four or more unit circuits may be included in each of the small circuit blocks.

(10) In the sixth embodiment, three unit circuits are included in each of the circuit blocks. However, two or four or more unit circuits may be included in each of the circuit blocks.

Figure 17:
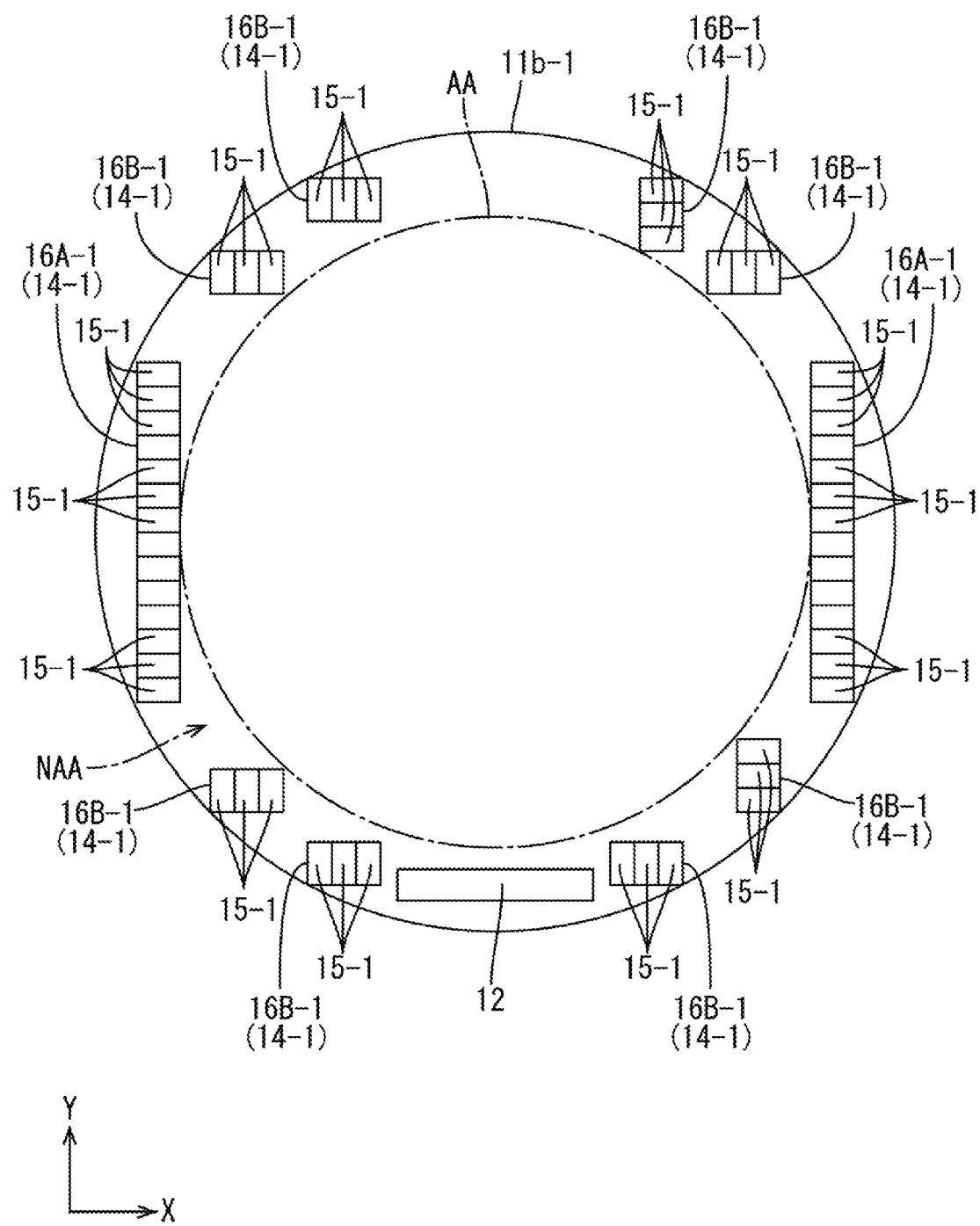
FIG. 17 is a plan view of an array board of a liquid crystal panel according to another embodiment (11) of the invention.

(11) In the second embodiment, the unit circuits in every-one of the small circuit blocks are arranged in the direction perpendicular to the arrangement direction of the unit circuits in the large circuit block. However, the small circuit blocks may include at least one small circuit block including the unit circuits arranged in the arrangement direction of the unit circuits in the large circuit blocks and at least one small circuit block including the unit circuits arranged in the direction perpendicular to the arrangement direction of the unit circuits in the large circuit blocks. Specifically described, for example, as illustrated in FIG. 17, in one of gate circuit portions 14-1 (on the right in FIG. 17), adjacent two of small circuit blocks 16B-1 may include a small circuit block 16B-1 including unit circuits 15-1 arranged in the arrangement direction of the unit circuits 15-1 in a large circuit block 16A-1 and a small circuit block 16B-1 including unit circuits 15-1 arranged in a direction perpendicular to the arrangement direction of the unit circuits 15-1 in the large circuit block 16A-1. In this configuration, a TEG for characteristic evaluation in the production steps or a sensor is able to be disposed in the space between the adjacent small circuit blocks 16B-1 or the array board 11b-1 is able to have a cutout at an outer circumferential portion.

(12) In the third and fourth embodiments, the gate circuit portion and the driver are respectively located at the right side and the left side of the display area in the drawings. However, the driver and the gate circuit portion may be respectively located at the right side and the left side of the display area in the drawings.

(13) In the fifth embodiment, the display area has a substantially vertically elongated elliptical shape in a plan view. However, the display area may have a substantially horizontally elongated elliptical shape in a plan view (a substantially elliptical shape having the major axis extending in the X-axis direction and the minor axis extending in the Y-axis direction). The specific flattening (the specific ratio between the length of the major axis and the length of the short axis) of the display area may be altered as necessary from that in the drawing.

(14) The configuration of the fifth embodiment may be combined with the configurations of the second and fourth embodiments. The arrangement direction of the unit circuits in the small circuit blocks may extend in a direction perpendicular to the arrangement direction of the unit circuits included in the large circuit blocks.

(15) The configuration of the fifth embodiment may be combined with the configuration of the third embodiment or the configuration of the sixth embodiment.

(16) The configuration of the sixth embodiment may be combined with the configuration of the second embodiment. At least one of the circuit blocks may include the unit circuits arranged in a direction perpendicular to the arrangement direction of the unit circuits in another of the circuit blocks.

(17) The configuration of the sixth embodiment may be combined with the configurations of the third and fourth embodiments. The driver and the gate circuit portion may be arranged with the display area therebetween in the extending direction of the gate lines.

(18) In the above embodiments, the unit circuits include the shift registers. However, the unit circuit may include a circuit other than the shift register. Furthermore, the specific number of the circuit elements included in each of the unit circuits and the arrangement of the circuit elements may be altered as necessary from those in the drawings.

(19) In the above embodiments, the display area has a substantially circular shape or a substantially elliptical shape in a plan view. However, the display area may have a non-circular shape having a curved outline over the entire circumference in a plan view (for example, the display area has a gourd-like shape in a plan view).

(20) In the above embodiments, the display area has a curved outline over the entire circumference. However, the present invention is applicable to an array board including a display area having a curved outline portion and a linear outline portion. Specific examples of the shape of such a display area in a plan view include a semicircular shape, an arched shape, and a fan-like shape.

(21) In the above embodiments, the display area has the curved outline over the entire circumference. However, the present invention is applicable to an array board having a display area that has only a linear outline portion and no curved outline portion. Such a display area has a polygonal outline having an acute or obtuse interior angle, i.e., not an angle of 90°. Specifically described, the shape of the display area in a plan view may be a polygon such as a triangle, a trapezoid, and a polygon having five or more sides.

(22) In the above embodiments, the oxide semiconductor material is used for the semiconductor film that forms the channel portion included in the TFT. Preferable examples of the material include an In—Ga—Zn—O based semiconductor (indium gallium zinc oxide) containing indium (In), gallium (Ga), zinc (Zn), and oxygen (O). The In—Ga—Zn—O based semiconductor is a ternary oxide containing indium (In), gallium (Ga), and zinc (Zn). The ratio of In, Ga, and Zn (a composition ratio) is not limited. For example, In:Ga:Zn may be 2:2:1, 1:1:1, or 1:1:2. The In—Ga—Zn—O based semiconductor containing In, Ga, and Zn with the ratio of 1:1:1 is particularly preferable. Such an oxide semiconductor (the In—Ga—Zn—O based semiconductor) may have an amorphous structure, but preferably a crystalline structure including crystalline components. It is preferable to employ a crystalline In—Ga—Zn—O based semiconductor with the c axis substantially perpendicular to a layer surface as the oxide semiconductor having the crystalline structure. An example of the crystalline structure of such an oxide semiconductor (the In—Ga—Zn—O based semiconductor) is disclosed in Japanese Unexamined Patent Application Publication No. 2012-134475. The disclosure of Japanese Unexamined Patent Application Publication No. 2012-134475 is incorporated by reference herein its entirety.

(23) In the above embodiments, the semiconductor film that forms the channel portion of the TFT is made of the oxide semiconductor material. However, the material of the semiconductor film may be polysilicon (continuous grain silicon (CG silicon), which is one kind of silicon in polycrystalline form (polycrystalline silicon), or amorphous silicon).

(24) In the above embodiments, the color filter in the liquid crystal panel includes the R, G, and B color portions. However, four or more colors of color portions may be used.

(25) In the above embodiments, the transmissive liquid crystal panel is described as an example. However, the present invention is also applicable to a semi-transmissive liquid crystal panel. Furthermore, the present invention is applicable to a reflective liquid crystal panel. In such a case, the glass board (board) of the array board may be non-transparent.

(26) In the above embodiments, the TFTs are used as the switching elements in the liquid crystal panel. However, the present invention is applicable to a liquid crystal panel including switching elements other than the TFTs (e.g., thin film diodes (TFDs)). The present invention is applicable to a black-and-white liquid crystal panel other than the color liquid crystal display device.

(27) In the above embodiments, the pixel electrodes are disposed on the array board and the counter electrodes are disposed on the CF board in the liquid crystal panel. However, a liquid crystal panel including pixel electrodes and counter electrodes disposed on an array board may be used. Preferably, such a liquid crystal panel may operate in in-plane switching (IPS) mode or fringe field switching (FFS) mode.

(28) In the above embodiments, the liquid crystal panel is described as an example. However, the present invention is also applicable to other types of display panels such as a plasma display panel (PDP), an organic EL panel, an electrophoretic display panel (EPD), and a micro electromechanical system (MEMS).

(29) In the above embodiments, the smart watch is described as an example of the electronic device provided with the liquid display device. However, the present invention is also applicable to liquid display devices used in smart phones, tablet-type laptop computers, portable video game players, or instrument display parts for transport vehicles such as cars, for example.

(30) In the above embodiments, the CF board and the array board included in the liquid crystal panel each include the glass board. However, the CF board and the array board each may include a resin board formed of synthetic resin. The specific material of the boards may be changed as necessary.

(31) The specific routing path (the number of bent portions, for example) or the number of block connection lines connecting the circuit blocks may be altered from those described in the above embodiments as necessary.

(32) In the above first, second, fifth, and sixth embodiments, the unit circuits, which constitute the two gate circuit portions, are connected to the ends of the gate lines to input gate signals to the gate lines from the ends. However, the unit circuits constituting the two gate circuit portions may be connected to one of the ends of the respective gate lines to input gate signals to the respective gate lines from one end. In such a case, the unit circuits constituting one of the gate circuit portions and the unit circuits constituting the other of the gate circuit portions may be alternately connected to the gate lines arranged in the Y-axis direction. This configuration allows the arrangement pitch between the gate lines to be small, leading to high resolution.

EXPLANATION OF SYMBOLS

11: liquid crystal panel (display device), 11*a:* CF board (counter board), 11*b,* 11*b*-1, 411*b:* array board (display board), 11*g:* TFT (display element), 11*i,* 111*i,* 211*i,* 311*i:* gate line (element connection line), 14, 14-1, 114, 214, 314, 514: gate circuit portion (element drive circuit portion), 15, 15-1, 115, 215, 315, 415, 515: unit circuit, 16, 116, 216, 316, 516: circuit block, 16A, 16A-1, 116A, 216A, 316A, 416A: large circuit block, 16B, 16B-1, 116B, 216B, 316B: small circuit block, 17, 117: block connection line, AA: display area, NAA: non-display area

The invention claimed is:

1. A display board comprising:
   a display area having a non-rectangular shape;
   a plurality of display elements in the display area;
   a plurality of element connection lines at least in the display area, extending in a first direction, and connected to the plurality of display elements;
   a non-display area surrounding the display area;
   a plurality of unit circuits in the non-display area to drive the plurality of display elements and grouped into at least a first block and a second block each including some of the plurality of unit circuits with long edges of the plurality of unit circuits contacting each other and short edges of the plurality of unit circuits aligned, the plurality of unit circuits being connected to the plurality of element connection lines; and
   a block connection line extending across the at least the first block and the second block in the non-display area to connect the some of the plurality of unit circuits in the first block to the some of the plurality of unit circuits in the second block, wherein
   the first block and the second block are separated from each other in a third direction such that the first block and the second block do not overlap when viewed along a second direction,
   the short edges of the some of the plurality of unit circuits in the first block are aligned in the second direction, and
   the short edges of the some of the plurality of unit circuits in the second block are aligned in the first direction.

2. The display board according to claim 1, wherein a total number of the some of the plurality of unit circuits in the first block is greater than a total number of the some of the plurality of unit circuits in the second block.

3. The display board according to claim 2, wherein the second direction is perpendicular to the first direction.

4. The display board according to claim 3, wherein
   the display area has dimensions in the first direction,
   the dimensions are different at positions in the second direction, and
   the first block is located at one of positions where one of the dimensions of the display area in the first direction is maximum.

5. The display board according to claim 4, wherein
   the display area has a circular shape in a plan view, and
   the first block is located at a middle in the second direction and the second block is located at an end in the second direction.

6. The display board according to claim 4, wherein
   the plurality of unit circuits are grouped into at least the first block, the second block, and a third block,
   a total number of the some of the plurality of unit circuits in the third block is equal to a total number of the some of the plurality of unit circuits in the second block, and
   the second block and the third block are symmetrically arranged in the second direction.

7. The display board according to claim 3, wherein the third direction is parallel to the second direction.

8. The display board according to claim 3, wherein
   the first block is located at a middle of the non-display area in the second direction, the second block is located at an end of the non-display area in the second direction, and the third direction is parallel to the second direction.

9. The display board according to claim 2, wherein
the plurality of unit circuits are grouped into at least the first block, the second block, a third block, and a fourth block,
a number of some of the plurality of unit circuits in the third block is equal to a number of the some of the plurality of unit circuits in the second block, and
a number of some of the plurality of unit circuits in the fourth block is equal to a number of the some of the plurality of unit circuits in the first block.

10. A display device comprising:
the display board according to claim 1; and
a counter board facing the display board.

11. The display board according to claim 1, wherein each of the plurality of unit circuits includes a thin-film transistor.

12. The display board according to claim 1, wherein the first block and the second block are separated from each other in the second direction.

13. The display board according to claim 1, wherein the plurality of unit circuits are in a half of the non-display area.

14. The display board according to claim 13, further comprising a driver separated from the plurality of unit circuits in the first direction.

15. The display board according to claim 1, wherein
the plurality of unit circuits are grouped into at least the first block, the second block, and a third block,
the third block includes some of the plurality of unit circuits with short edges aligned in the third direction, and
the second block and the third block are adjacent to each other.

16. The display board according to claim 15, wherein
the some of the plurality of unit circuits in the third block include short edges aligned in the second direction, and
the some of the plurality of unit circuits in the fourth block include short edges aligned in the second direction.

17. The display board according to claim 1, wherein the third direction is the same as the first direction.

* * * * *